United States Patent
Hung et al.

(10) Patent No.: US 10,422,997 B2
(45) Date of Patent: Sep. 24, 2019

(54) HEAD-MOUNTED DISPLAY DEVICE

(71) Applicant: Coretronic Corporation, Hsin-Chu (TW)

(72) Inventors: Yi Hung, Hsin-Chu (TW); Chih-Wei Shih, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/920,469

(22) Filed: Mar. 14, 2018

(65) Prior Publication Data
US 2018/0335628 A1 Nov. 22, 2018

(30) Foreign Application Priority Data
May 16, 2017 (CN) .......................... 2017 1 0343432

(51) Int. Cl.
*G02B 27/01* (2006.01)
*F21V 8/00* (2006.01)
*G02B 27/00* (2006.01)

(52) U.S. Cl.
CPC ....... *G02B 27/0172* (2013.01); *G02B 6/0028* (2013.01); *G02B 6/0055* (2013.01);
(Continued)

(58) Field of Classification Search
CPC ............ G02B 27/0172; G02B 27/0101; G02B 6/0028; G02B 6/055; G02B 27/0081; G02B 2027/012; G02B 2027/0125
See application file for complete search history.

(56) References Cited

U.S. PATENT DOCUMENTS

| 5,076,664 A | 12/1991 | Migozzi |
| 6,563,626 B1 | 5/2003 | Iwasaki |

(Continued)

FOREIGN PATENT DOCUMENTS

| CN | 102928981 | 2/2013 |
| CN | 104204905 | 12/2014 |

(Continued)

OTHER PUBLICATIONS

Yaakov Amitai, "P-27: A Two-Dimensional Aperture Expander for Ultra-Compact, High-Performance Head-Worn Displays, " SID Symposium Digest of Technical Papers, May 2005, pp. 360-363.
(Continued)

*Primary Examiner* — Ryan D Howard
(74) *Attorney, Agent, or Firm* — JCIPRNET

(57) ABSTRACT

A HMD device includes an illumination system, a display device, a lens module and a waveguide system. The illumination system includes an aperture stop. The display device converts an illumination beam into an image beam. The waveguide system guides the image beam, and projects the image beam to a projection target. The waveguide system includes a first waveguide element and a second waveguide element. The image beam is projected to the projection target through the lens module, the first and the second waveguide elements, and is converged to a first stop within the first waveguide element. The first stop is located in the first waveguide element. The image beam is projected to a second stop outside the second waveguide element. The second stop is located at the projection target. The illumination beam is converged to a third stop within the illumination system. The aperture stop is located at the third stop.

16 Claims, 26 Drawing Sheets

(52) U.S. Cl.
CPC .... *G02B 27/0081* (2013.01); *G02B 2027/012* (2013.01); *G02B 2027/0125* (2013.01)

(56) References Cited

U.S. PATENT DOCUMENTS

| | | | |
|---|---|---|---|
| 6,577,429 B1 | 6/2003 | Kurtz et al. | |
| 6,646,806 B1 | 11/2003 | Bierhuizen | |
| 6,829,095 B2 | 12/2004 | Amitai | |
| 7,242,527 B2 * | 7/2007 | Spitzer | G02B 27/0172 345/8 |
| 7,576,916 B2 | 8/2009 | Amitai | |
| 8,189,263 B1 | 5/2012 | Wang et al. | |
| 8,433,172 B2 | 4/2013 | Pascal et al. | |
| 8,743,464 B1 | 6/2014 | Amirparviz | |
| 8,810,914 B2 | 8/2014 | Amitai | |
| 9,261,688 B2 | 2/2016 | Takeda et al. | |
| 2006/0114676 A1 | 6/2006 | Yamada et al. | |
| 2006/0132914 A1 | 6/2006 | Weiss et al. | |
| 2006/0228073 A1 | 10/2006 | Mukawa et al. | |
| 2008/0025667 A1 | 1/2008 | Amitai | |
| 2008/0246923 A1 | 10/2008 | Wu | |
| 2008/0285137 A1 | 11/2008 | Simmonds et al. | |
| 2009/0190222 A1 | 7/2009 | Simmonds et al. | |
| 2010/0321409 A1 | 12/2010 | Komori et al. | |
| 2012/0062850 A1 | 3/2012 | Travis | |
| 2012/0176682 A1 | 7/2012 | DeJong | |
| 2013/0250431 A1 | 9/2013 | Robbins et al. | |
| 2014/0140653 A1 | 5/2014 | Brown et al. | |
| 2014/0140654 A1 | 5/2014 | Brown et al. | |
| 2014/0160577 A1 | 6/2014 | Dominici et al. | |
| 2014/0293434 A1 | 10/2014 | Cheng et al. | |
| 2015/0003796 A1 | 1/2015 | Bennett | |
| 2015/0138446 A1 | 5/2015 | Sheng | |
| 2015/0323790 A1 | 11/2015 | Dominici et al. | |
| 2015/0338660 A1 | 11/2015 | Mukawa | |
| 2015/0346506 A1 | 12/2015 | Huang et al. | |
| 2016/0004090 A1 | 1/2016 | Popovich et al. | |
| 2016/0124223 A1 | 5/2016 | Shinbo et al. | |
| 2016/0231568 A1 | 8/2016 | Saarikko et al. | |
| 2016/0320621 A1 | 11/2016 | Biteau et al. | |
| 2017/0180685 A1 | 6/2017 | Takagi et al. | |
| 2017/0192230 A1 | 7/2017 | Miyazaki et al. | |
| 2017/0285346 A1 | 10/2017 | Pan | |
| 2018/0101011 A1 | 4/2018 | Shih et al. | |
| 2018/0203236 A1 | 7/2018 | Shih et al. | |
| 2018/0203237 A1 | 7/2018 | Shih et al. | |
| 2018/0299678 A1 | 10/2018 | Singer et al. | |

FOREIGN PATENT DOCUMENTS

| | | |
|---|---|---|
| CN | 104503087 | 4/2015 |
| CN | 104656259 | 5/2015 |
| CN | 105116547 | 12/2015 |
| CN | 105393050 | 3/2016 |
| CN | 105572873 | 5/2016 |
| CN | 103135234 | 3/2017 |
| CN | 107329259 | 11/2017 |
| EP | 2905655 | 8/2015 |
| JP | 2003029203 | 1/2003 |
| JP | 3610931 | 1/2005 |
| JP | 2007010830 | 1/2007 |
| JP | 2014063173 | 4/2014 |
| JP | 2016110782 | 6/2016 |
| TW | 522256 | 3/2003 |
| TW | I484219 | 5/2015 |
| TW | 201719233 | 6/2017 |
| WO | 2011024291 | 3/2011 |
| WO | 2012088478 | 6/2012 |
| WO | 2016051439 | 4/2016 |
| WO | 2016179246 | 11/2016 |

OTHER PUBLICATIONS

Bernard C. Kress, et al., "Diffractive and Holographic Optics as Optical Combiners in Head Mounted Displays," UbiComp'13, Sep. 8-12, 2013, pp. 1479-1482.

"Search Report of Europe Counterpart Application", dated Oct. 17, 2018, p. 1-p. 13.

"Search Report of Europe Counterpart Application", dated Feb. 25, 2019, p. 1-p. 14.

* cited by examiner

HEAD-MOUNTED DISPLAY DEVICE

CROSS-REFERENCE TO RELATED APPLICATION

This application claims the priority benefit of China application Ser. No. 201710343432.6, filed on May 16, 2017. The entirety of the above-mentioned patent application is hereby incorporated by reference herein and made a part of this specification.

BACKGROUND OF THE INVENTION

Field of the Invention

The invention relates to a display system, and particularly relates to head-mounted display (HMD).

Description of Related Art

Near eye display (NED) and head-mounted display (HMD) are the most promising killer products of the next generation. Related applications of the NED technique are presently divided into an augmented reality (AR) technique and a virtual reality (VR) technique. Regarding the AR technique, relevant developers are currently working on how to provide the best image quality under the premise of light and slim.

In an optical architecture of using the HMD to implement the AR, after an image beam used for displaying is sent by a projection device, the image beam enters an eye of a user through waveguide. An image coming from a light valve and an external environmental beam enters the eye of the user through the waveguide, so as to achieve the effect of AR. In HMD products, since a distance between the waveguide and an optical engine mechanism is too close, the environmental beam is blocked from entering the eye of the user, which spoils a sense of immersion, and the effectiveness of AR is greatly reduced.

Regarding a demand on the HMD, the HMD is expected to be closer to a design of general myopia glasses or sunglasses, so that how to move the huge optical engine to the outside of a user's visual area to avoid blocking a line of sight of the user is one of the most important issues currently. Moreover, a magnitude of a field of view (FOV) provided by the HMD and a volume of the HMD are also important factors that influence a user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a head-mounted display (HMD) device, which is adapted to provide a large field of view (FOV) and good image quality, and has a small volume.

In order to achieve one or a portion of or all of the objects or other objects, an embodiment of the invention provides a head-mounted display (HMD) device. The HMD device includes an illumination system, a display device, a lens module and a waveguide system. The illumination system is configured to provide an illumination beam, and includes an aperture stop. The display device is configured to convert the illumination beam into an image beam. The image beam is transmitted and projected to a projection target. The lens module is configured to receive and project the image beam. The waveguide system is configured to guide the image beam, and projects the image beam to the projection target. The waveguide system includes a first waveguide element and a second waveguide element. The image beam is projected to the projection target through the lens module, the first waveguide element and the second waveguide element. The image beam is converged to a first stop within the first waveguide element. The first stop is located in the first waveguide element. The image beam leaves the second waveguide element, and is projected to a second stop outside the second waveguide element. The second stop is located at the projection target. The illumination beam is converged to a third stop within the illumination system. The aperture stop is located at the third stop.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
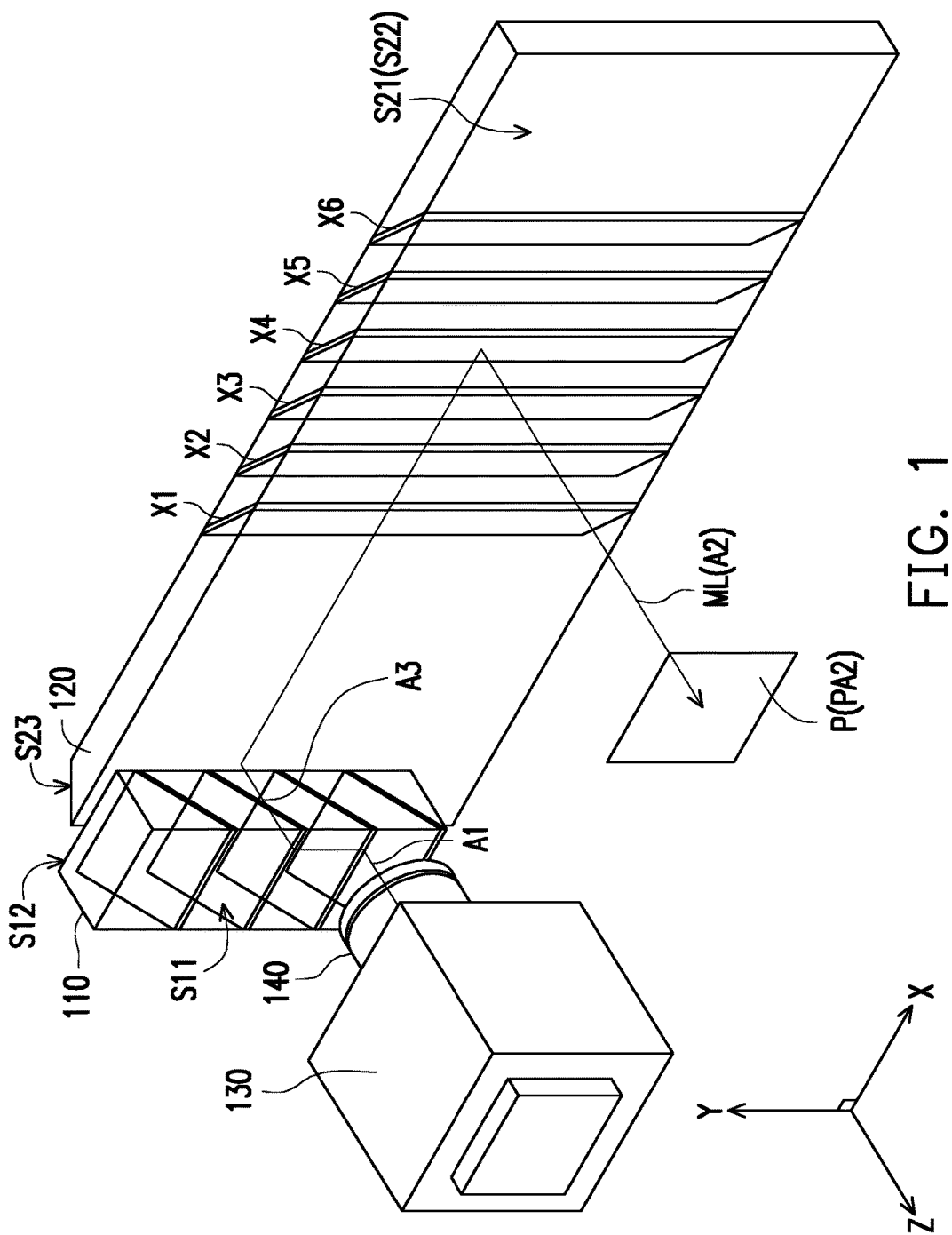
FIG. 1 is a three-dimensional view of a head-mounted display (HMD) device according to an embodiment of the invention.
Figure 2A:
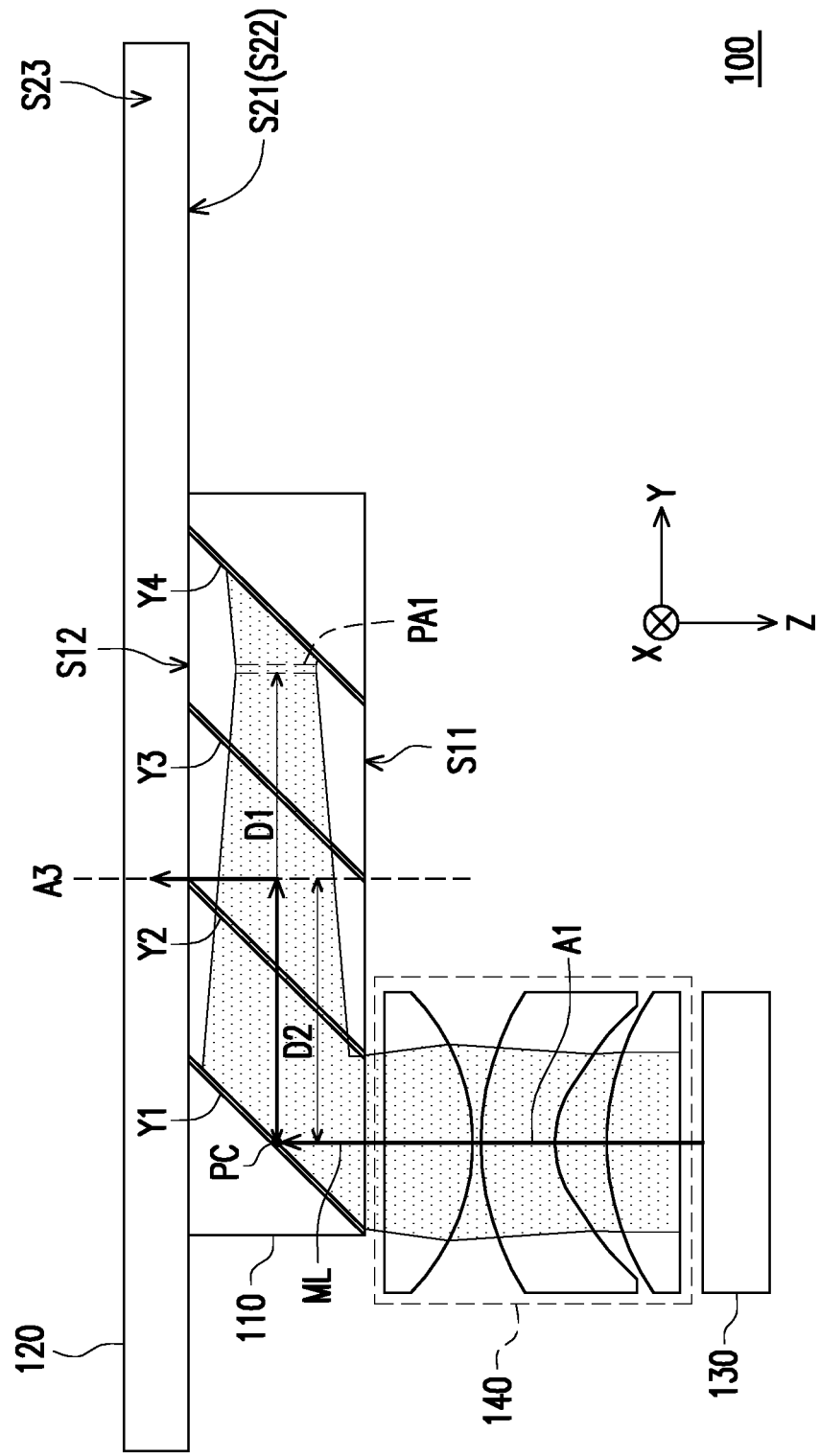
FIG. 2A is a side view of the HMD of FIG. 1.

FIG. 1 is a three-dimensional view of a head-mounted display (HMD) device according to an embodiment of the invention. FIG. 2A is a side view of the HMD of FIG. 1. Referring to FIG. 1 and FIG. 2A, the HMD 100 of the embodiment includes a first waveguide element 110, a second waveguide element 120, a display device 130 and a lens module 140. The second waveguide element 120 is connected to the first waveguide element 110. The lens module 140 is disposed between the display device 130 and the first waveguide element 110.

In the embodiment, the first waveguide element 110 includes a first light incident surface S11, a first light exiting surface S12, and a plurality of first light splitting elements Y1, Y2, Y3, Y4. The first light splitting elements Y1, Y2, Y3, Y4 are arranged along a first direction Y. In the embodiment, the first light incident surface S11 is disposed opposite to the first light exiting surface S12, though the invention is not limited thereto. In an embodiment, based on different configuration positions of the display device 130, the first light incident surface S11 may also be connected to the first light exiting surface S12. In the embodiment, an image beam ML has a trans-reflective optical effect at positions of the first light splitting elements Y1, Y2, Y3, Y4, and the first light splitting elements Y1, Y2, Y3, Y4 are, for example, see through mirrors (STM). In the embodiment, the second waveguide element 120 includes a second light incident surface S21, a second light exiting surface S22 and a plurality of second light splitting elements X1, X2, X3, X4, X5, X6, where the second light incident surface S21 and the second light exiting surface S22 belong to a same surface, and the second light incident surface S21 of the second waveguide element 120 faces the first light exiting surface S12 of the first waveguide element 110. The second light splitting elements X1, X2, X3, X4, X5, X6 are arranged along a second direction X. In the embodiment, the image beam ML has the trans-reflective optical effect at positions of the second light splitting elements X1, X2, X3, X4, X5, X6. In the embodiment, the quantity of the light splitting elements included in each of the waveguide elements and a gap between two adjacent light splitting elements may be designed according to different product requirements, and are not limited by the invention. Moreover, the quantity of the first light splitting elements may be the same or different to the quantity of the second light splitting elements, and the gaps between the adjacent light splitting elements may be the same or different. In the embodiment, the display device 130 is used for converting an illumination beam coming from an illumination system into the image beam ML, so as to provide the image beam ML to the lens module 140, where the illumination system is described in detail below. In the embodiment, the display device 130, for example, includes digital micromirror devices (DMD) in a digital light Processing™ (DLP™) projection system, a liquid-crystal display (LCD) projection system or a liquid crystal on silicon (LCoS) projection system, etc., which is not limited by the invention. In the embodiment, the lens module 140 is, for example, one or a plurality of lenses, and the quantity thereof is not limited and is determined according to an actual design requirement. The lens module 140 has an optical axis A1 extending along a third direction Z. The image beam ML is transmitted along the third direction Z in the lens module 140. The image beam ML coming from the display device 130 passes through the lens module 140, and is incident to the first waveguide element 110 through the first light incident surface S11. In the embodiment, the image beam ML in the first waveguide element 110 passes through the first light splitting element Y1 and is transmitted along the first direction Y, and after the reflection function of the first light splitting elements Y1, Y2, Y3, Y4, the image beam ML leaves the first waveguide element 110 through the first light exiting surface S12 along a direction (−Z) opposite to the third direction Z. It should be noted that the first light splitting elements Y1, Y2, Y3, Y4 are see through mirrors, i.e. a part of the image beam ML is reflected by the first light splitting elements Y1, Y2, Y3, Y4, and a part of the image beam ML penetrates through the first light splitting elements Y1, Y2, Y3, Y4. In the embodiment, an optical path of the image beam ML is a description focus.

Moreover, the image beam ML coming from the first waveguide element 110 is incident to the second waveguide element 120 through the second light incident surface S21 along the direction (−Z) opposite to the third direction Z, and is transmitted to the second light splitting elements X1, X2, X3, X4, X5, X6 of the second waveguide element 120 after being reflected by a reflection surface S23 of the second waveguide element 120. In the embodiment, the image beam ML in the second waveguide element 120 is transmitted along the second direction X, and after the reflection function of the second light splitting elements X1, X2, X3, X4, X5, X6, the image beam ML leaves the second waveguide element 120 through the second light exiting surface S22 and is projected to a projection target P. Therefore, in the embodiment, the second light incident surface S21 and the second light exiting surface S22 are a same surface of the second waveguide element 120, though the second light exiting surface S22 faces the projection target P. In the embodiment, the projection target P is, for example, a pupil, which is one of the eyes of the user. In other embodiment, the projection target P is, for example, an image sensing device used for receiving the image beam ML, for example, a charge-coupled device (CCD), or a complementary metal-oxide-semiconductor image sensor (CMOS image sensor).

In the embodiment, the image beam ML is transmitted in the lens module 140 along the direction (−Z) opposite to the third direction Z, where a transmitting direction thereof is substantially the same to an extending direction of the optical axis A1. In the embodiment, the projection target P has a visual axis A2, where an extending direction thereof (the third direction Z) is substantially the same to the transmitting direction of the image beam ML projected to the projection target P, and is perpendicular to the first direction Y. Therefore, in FIG. 1, by translating the visual axis A2 of the projection target P to a YZ plane (a reference plane) in the first waveguide element 110, a reference axis A3 is indicated in the first waveguide element 110, as shown in FIG. 2A.

Namely, in the embodiment, the projection target P has the visual axis A2 perpendicular to the first direction Y, and the visual axis A2 is translated to the reference axis A3 on the reference plane YZ in the first waveguide element 110. In FIG. 2A, on the reference plane YZ, and on a transmission path of the illumination beam ML, a distance between a first stop PA1 formed by the illumination beam ML and a center position PC of the first light splitting element Y1 of the first light splitting elements Y1, Y2, Y3, Y4 in the first direction Y is D1, and a distance between the reference axis A3 and the center position PC of the first light splitting element Y1 in the first direction Y is D2. In the embodiment, the distance D1 is greater than or equal to the distance D2. The first light splitting element Y1 is one of the first light splitting elements that first reflects the image beam ML after a part of the image beam ML enters the first waveguide element 110, and is one of the first light splitting elements Y1, Y2, Y3, Y4 that is located the closest to the lens module 140.

In the embodiment, the image beam ML coming from the lens module 140 is converged to the first stop PA1 in the first waveguide element 110. The first stop PA1 is located in the first waveguide element 110. In the embodiment, the first stop PA is a position where the image beam ML is converged to the minimum beam diameter within the first waveguide element 110, and after the image beam ML passes through the position of the first stop PA, the image beam ML starts to be divergent. For example, the lens module 140 makes the image beam ML incident to the first waveguide element 110 to start converging from the first light splitting element Y1, and reach the minimum beam diameter at the first stop PA1. After passing through the first stop PA1, the image beam ML starts to be divergent and is incident to the first light splitting element Y4 and reflected to the first light exiting surface S12. In the embodiment, after the image beam ML leaves the second waveguide element 120 through the second light exiting surface S22, the image beam ML is projected to a second stop PA2 outside the second waveguide element 120. The second stop PA2 is located at the projection target P. For example, the second light splitting elements X1, X2, X3, X4, X5, X6 may reflect the image beam ML incident to the second waveguide element 120 to leave the second waveguide element 120 through the second light exiting surface S22, and the image beam ML is projected to the position of the second stop PA2, such that the image beam ML may be incident to the projection target P, where the position of the second stop PA2 is substantially the same to the position of the projection target P, i.e. a position where one of the eyes of the user may view an image, i.e. the position of the second stop PA2.

In the embodiment, a field of view (FOV) of the lens module 140 corresponds to a FOV of an image received at the projection target P. In other words, in the embodiment, a diagonal FOV of the image formed by the image beam ML received at the projection target P is substantially equal to a FOV of the image beam ML projected by the lens module 140. In other embodiments, the diagonal FOV of the image formed by the image beam ML received at the projection target P is substantially smaller than the FOV of the image beam ML projected by the lens module 140.

Figure 3:
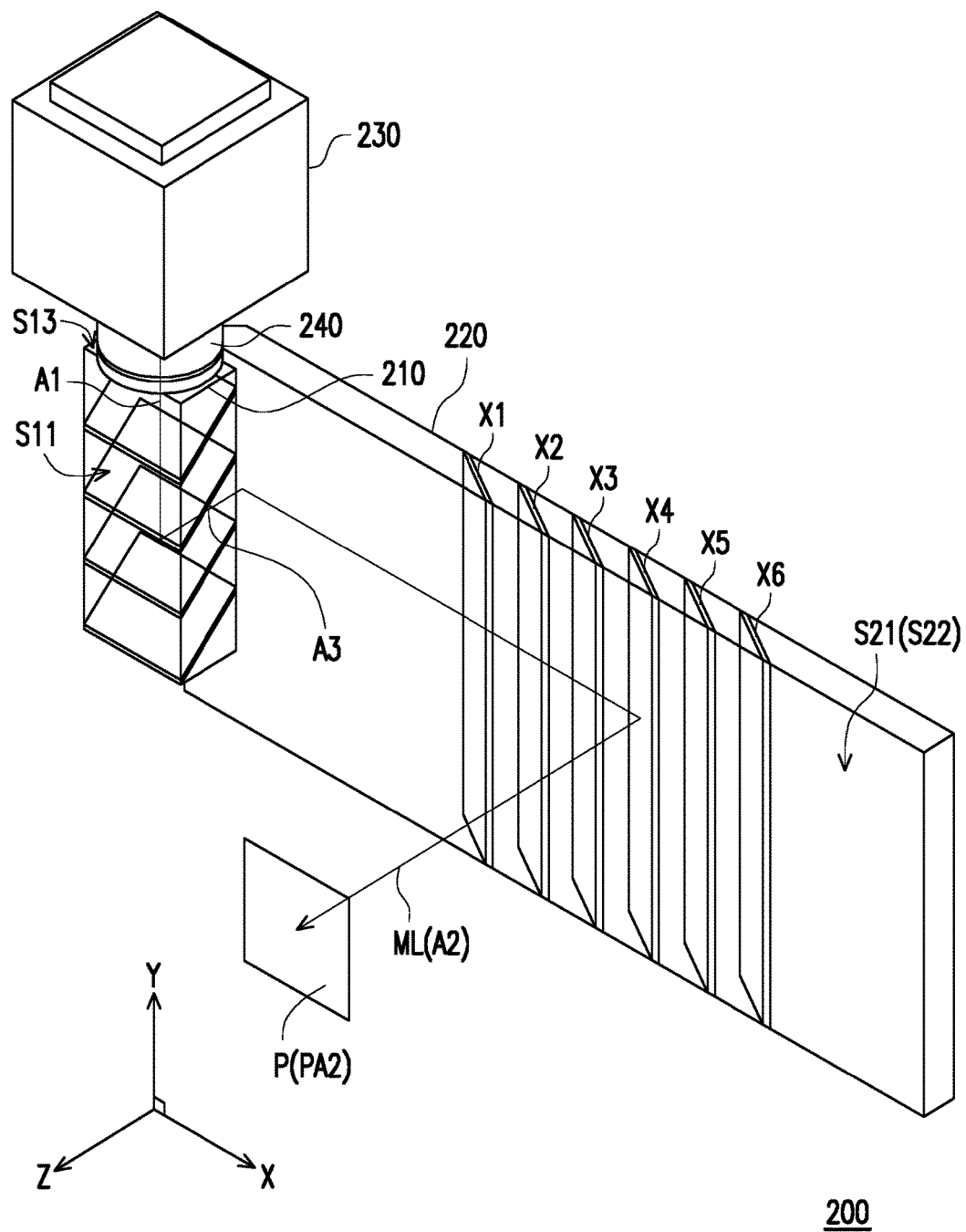
FIG. 3 is a three-dimensional view of a HMD device according to another embodiment of the invention.

Based on the diagonal FOV of the image formed by the image beam ML, a first FOV in the first direction Y and a second FOV in the second direction X are learned. In the embodiment, when the display device 130 projects the image beam ML to display an image with a projection ratio of 16:9, the image beam ML with the diagonal FOV of about 30 degrees to 90 degrees, for example, 40 degrees is projected through the lens module 140 to pass through the first waveguide element 110 and the second waveguide element 120, and is transmitted to the projection target P, such that the diagonal FOV of the image formed by the image beam ML received at the projection target P is about 30 degrees to 90 degrees, for example, 40 degrees, though the invention is not limited thereto. Those skilled in the art may calculate that the first FOV in the first direction Y is 10 degrees and the second FOV in the second direction X is about 17 degrees according to the projection ratio of 16:9. Therefore, by using the HMD device of the invention, the diagonal FOV of the image formed by the image beam ML received at the projection target P is about 30-90 degrees or above 90 degrees. Moreover, as shown in FIG. 2A, in another embodiment, the optical axis A1 of the lens module 140 is perpendicular to the first direction Y and is parallel to the visual axis A2 of the projection target P, and the diagonal FOV of the image formed by the image beam ML received at the projection target P may be 30-50 degrees. As shown in FIG. 3, in another embodiment, the optical axis A1 of the lens module 140 is parallel to the first direction Y and is perpendicular to the visual axis A2 of the projection target P, and the diagonal FOV of the image formed by the image beam ML received at the projection target P may be 50-90 degrees. The diagonal FOV may be designed according to different product requirements, which is not limited by the invention. The HMD device 100 may provide a large FOV and has a small volume.

In other embodiments, after the image beam ML projected by the lens module 140 forms the diagonal FOV of the image, a magnitude of the first FOV may be determined according to the quantity of the first light splitting elements in the first waveguide element 110, or determined according to a distance between the first piece of the first light splitting elements and the last piece of the first light splitting elements in the first waveguide element 110, or determined according to a distance between two adjacent first light splitting elements in the first waveguide element 110. Similarly, a magnitude of the second FOV is, for example, determined according to the quantity of the second light splitting elements in the second waveguide element 120, or determined according to a distance between the first piece of the second light splitting elements and the last piece of the second light splitting elements in the second waveguide element 120, or determined according to a distance between two adjacent second light splitting elements in the second waveguide element 120. It should be noted that the magnitude of the first FOV and the magnitude of the second FOV generated through the adjustment of the first waveguide element 110 and the second waveguide element 120 may all be smaller than or equal to the magnitude of the first FOV and the magnitude of the second FOV of the image formed by the image beam ML projected by the lens module 140.

Moreover, considering the image projection ratio provided by the display device 130 may influence the quantity of the first light splitting elements of the first waveguide element 110 and the quantity of the second light splitting elements of the second waveguide element 120, for example, if the projection ratio is 16:9, the quantity of the second light splitting elements of the second waveguide element 120 is greater than the quantity of the first light splitting elements of the first waveguide element 110. However, in other design conditions, the quantity of the second light splitting elements of the second waveguide element 120 may be smaller than the quantity of the first light splitting elements of the first waveguide element 110, which is not limited by the invention.

Moreover, based on different configuration positions of the display device and the lens module, in an embodiment, the first light incident surface of the first waveguide element may be adjacent to the first light exiting surface, and the optical axis of the lens module is parallel to the first direction. In an embodiment, the first light incident surface of the first waveguide element may be adjacent to the first light exiting surface, and the optical axis of the lens module may be perpendicular to the first direction and parallel to the second direction.

Figure 2B:
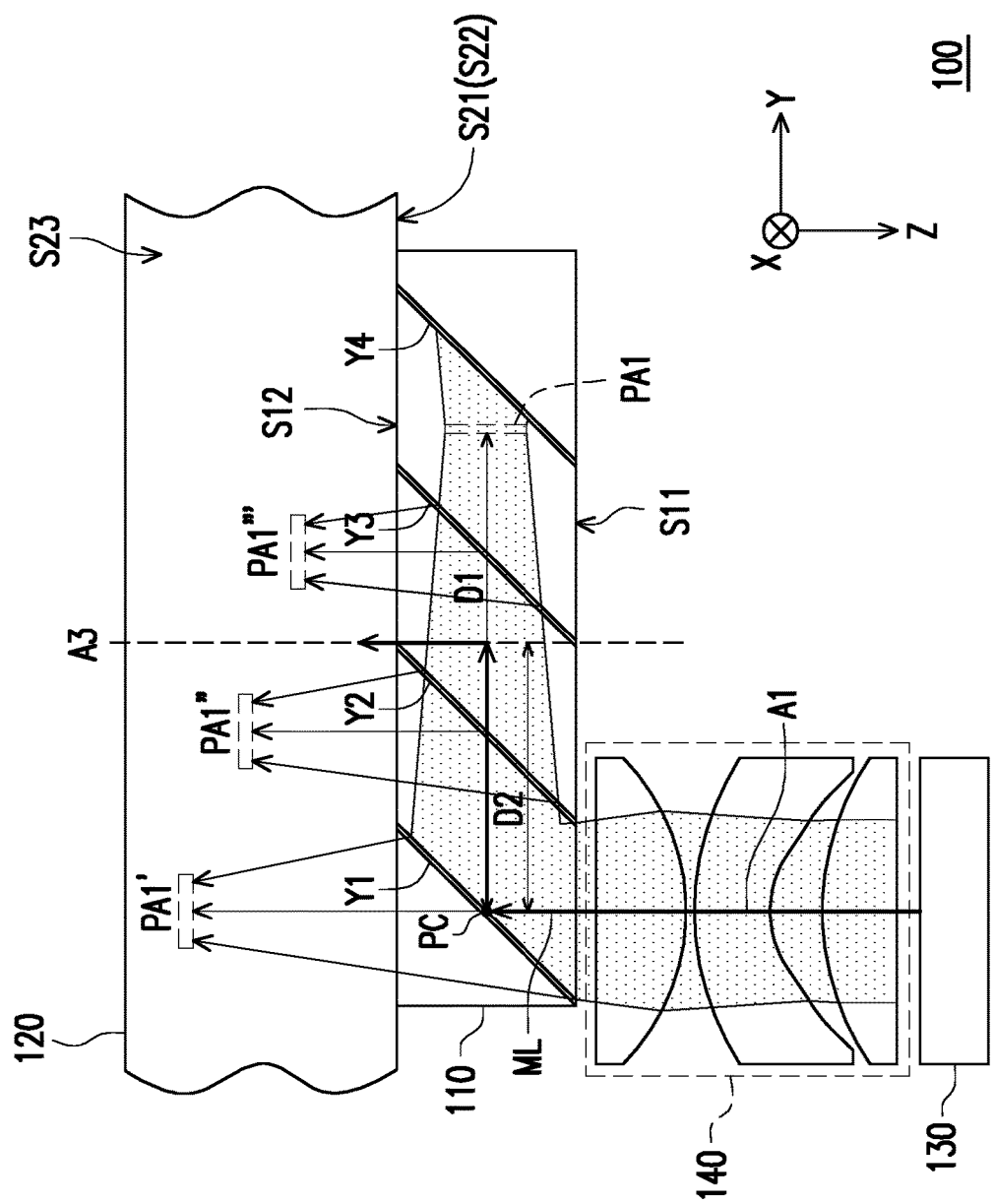
FIG. 2B is a side view of an optical path of the HMD device of the embodiment of FIG. 2A.

FIG. 2B is a side view of an optical path of the HMD device of the embodiment of FIG. 2A. Referring to FIG. 2B, since the first light splitting elements Y1, Y2, Y3, Y4 of the first waveguide element 110 are STMs, i.e. a part of the image beam ML is reflected by the first light splitting elements Y1, Y2, Y3, Y4, and a part of the image beam ML penetrates through the first light splitting elements Y1, Y2, Y3, Y4. In the embodiment, a part of the image beam ML in the first waveguide element 110 is converged to the position of the first stop PA1. Based on a basic optical principle, it is known that a part of the image beam ML that penetrates through the first light splitting element Y1 may also be converged to a position of a stop PA1' in the second waveguide element 120, and a distance between a center position of the first light splitting element Y1 and the position of the stop PA1' is equal to a distance between the center position of the first light splitting element Y1 and the position of the first stop PA1. Similarly, a part of the image beam ML reflected by the first light splitting elements Y2 and Y3 may also be converged to positions of stops PA1" and PA1''' in the second waveguide element 120, and a distance between a center position of the first light splitting element Y2 and the position of the stop PA1" is equal to a distance between the center position of the first light splitting element Y2 and the position of the first stop PA1, and a distance between a center position of the first light splitting element Y3 and the position of the stop PA1''' is equal to a distance between the center position of the first light splitting element Y3 and the position of the first stop PA1.

Figure 2C:
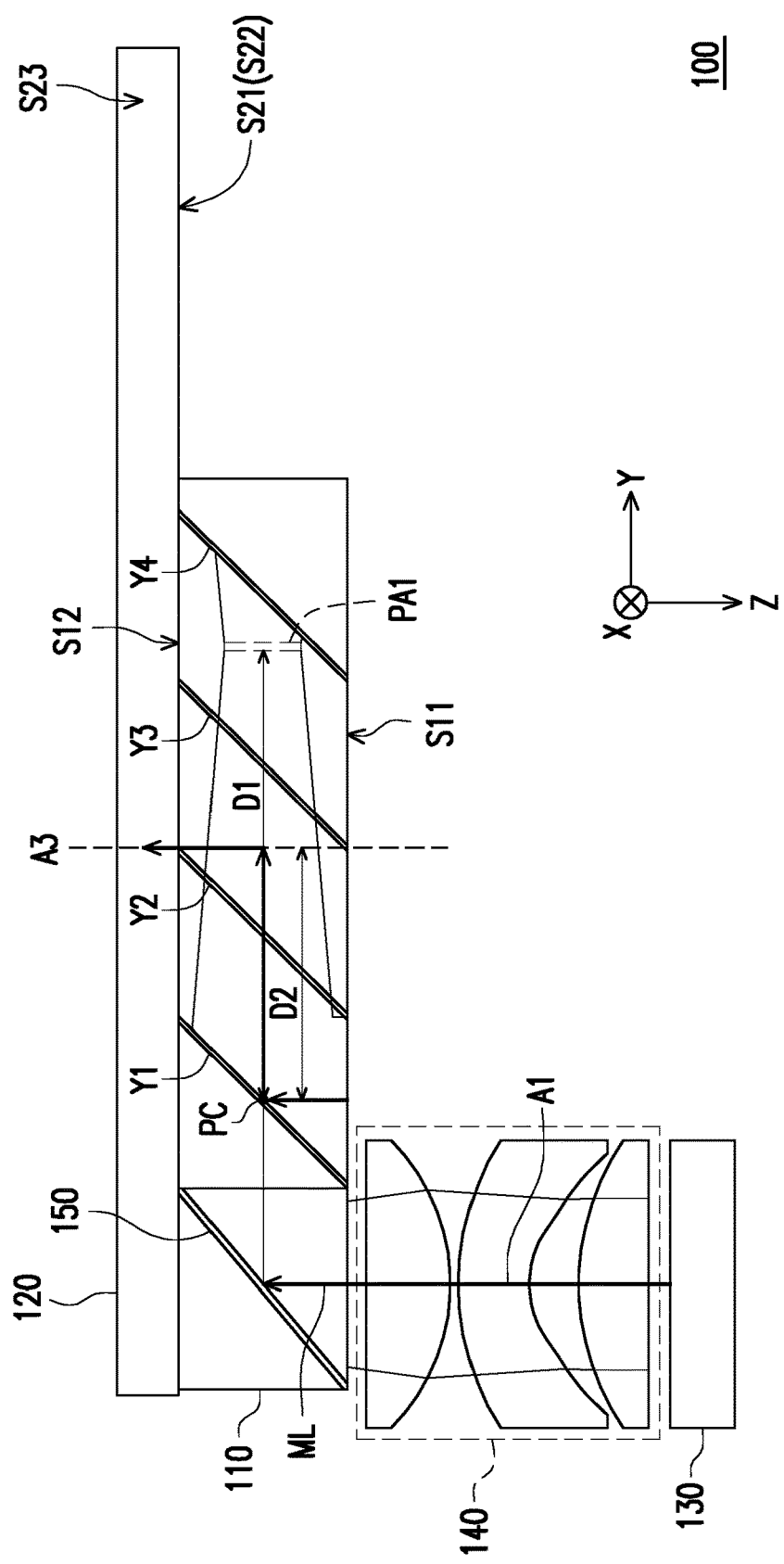
FIG. 2C is a side view of a HMD device according to another embodiment of the invention.

FIG. 2C is a side view of a HMD device according to another embodiment of the invention. The HMD device of the embodiment of FIG. 2C is a similar to the HMD device 100 of the embodiment of FIG. 2A, and components and related descriptions thereof may refer to the components and related descriptions of the HMD device 100, and details thereof are not repeated. Differences of the two HMD devices 100 are described as follows. In the embodiment, the HMD device 100 includes the first waveguide element 110 and the second waveguide element 120. Moreover, the HMD device 100 further includes a reflection mirror 150 disposed beside the first light incident surface S11, and faces the first light incident surface S11. The reflection mirror 150 is used for reflecting the image beam ML provided by the display device 130 through the lens module 140, such that the image beam ML enters the first waveguide element 110 from the first light incident surface S11. Then, the image beam ML entering the first waveguide element 110 may be reflected by a plurality of the first light splitting elements Y1, Y2, Y3, Y4 and transmitted to the second waveguide element 120.

To be specific, an included angle between the reflection mirror 150 and the first light incident surface S11 is, for example, 45 degrees. After the image beam ML is reflected by the reflection mirror 150, the image beam ML is incident to the first light splitting element Y1. Moreover, in the embodiment, the position of the first stop PA1 of the image beam ML is, for example, located in the first waveguide element 110. The position of the first stop PA1 is located among the first light splitting elements Y1, Y2, Y3, Y4. Therefore, the image beam ML transmitted in the first waveguide element 110 may be converged to the position of the first stop PAL In the embodiment, by setting the position of the first stop PA1 whereto the image beam ML is converged in internal of the first waveguide element 110, a situation that the image beam ML is too early to diverge on the XY plane to cause a total reflection at the first light exiting surface S12 and the first light incident surface S11 is avoided. Namely, the image beam ML may be guided to the second waveguide element 120 through the first light splitting elements Y1, Y2, Y3, Y4 before the total reflection is occurred, so that the image beam ML is avoided to have the total reflection in the first waveguide element 110 to cause the problem of an unexpected display image.

FIG. 3 is a three-dimensional view of a HMD device according to another embodiment of the invention. Referring to FIG. 1 and FIG. 3, the HMD device 200 of the embodiment is similar to the HMD device 100 of the embodiment of FIG. 1, and a difference there between is that a display device 230 and a lens module 240 of the HMD device 200 are disposed in parallel at a side edge of the first waveguide element 210, and the image beam ML coming from the lens module 240 is incident to the first waveguide element 210 from the first light incident surface S13 of the first waveguide element 210, and leaves the first waveguide element 210 through the first light exiting surface S12. Therefore, in the embodiment, the first light incident surface S13 of the first waveguide element 210 is contiguous to the first light exiting surface S12, and the optical axis A1 of the lens module 240 is parallel to the first direction Y. In the embodiment, the first stop PA1 is located in the first waveguide element 210, and the second stop PA2 is located at the projection target P. Moreover, a position of the first stop PA1 in the first waveguide element 210 is complied with a condition that the distance D1 is greater than or equal to the distance D2.

Figure 4:
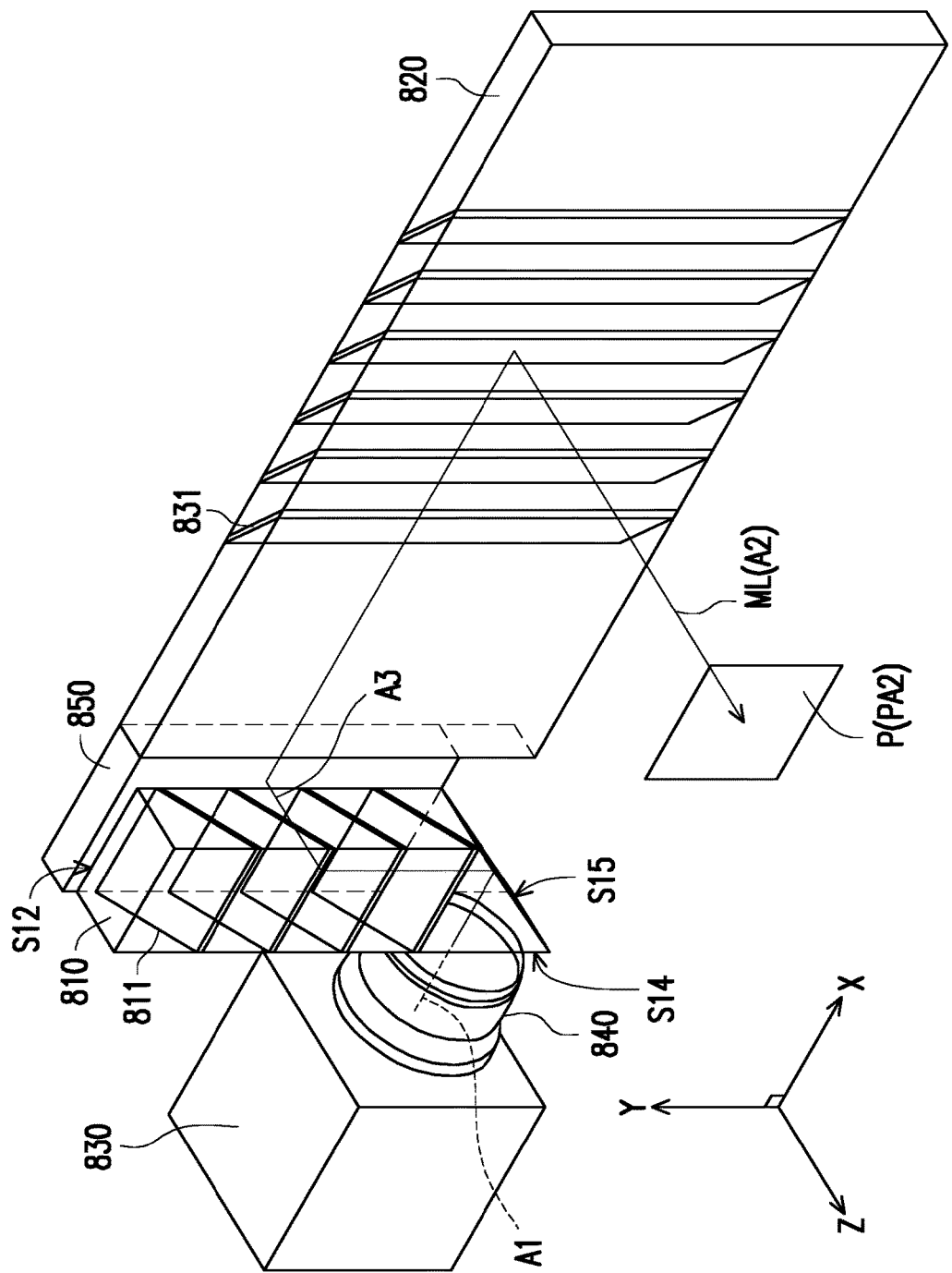
FIG. 4 is a three-dimensional view of a HMD device according to another embodiment of the invention.

FIG. 4 is a three-dimensional view of a HMD device according to another embodiment of the invention. Referring to FIG. 1 and FIG. 3, the HMD device 800 of the embodiment is similar to the HMD device 100 of the embodiment of FIG. 1, and a difference there between is that the first light incident surface is contiguous to the first light exiting surface, and the optical axis A1 of the lens module is perpendicular to the first direction Y and parallel to the second direction X.

To be specific, in the embodiment, the HMD device 800 includes a first waveguide element 810, a second waveguide element 820, a third waveguide element 850, a display device 830 and a lens module 840. In an embodiment, the third waveguide element 850 and the second waveguide element 820 are made of a same material and are structures formed integrally. The display device 830 is used for providing the image beam ML. In the embodiment, the image beam ML is incident to the first waveguide element 810 through the first light incident surface S14, and is reflected by a reflecting surface S15 to transmit towards the first direction Y. Then, the image beam ML leaves the first waveguide element 810 through the first light exiting surface S12. Therefore, in the embodiment, the first light incident surface S14 is contiguous to the first light exiting surface S12 and the reflecting surface S15, and the optical axis A1 of the lens module 840 is perpendicular to the first direction Y and parallel to the second direction X. Configuration positions of the display device 830 and the lens module 840 may be determined according to different product designs or optical characteristics, which are not limited by the invention. Moreover, the third waveguide element 850 of the embodiment may adopt a device design of a third waveguide element of one of the embodiments of FIG. 5A-FIG. 5C.

In the embodiment, the first waveguide element 810 includes a plurality of first light splitting elements 811. The image beam ML has the trans-reflective optical effect at the positions of the first light splitting elements 811, and is incident to the third waveguide element 850. The third waveguide element 850 may have a reflecting structure shown in the embodiments of FIG. 5A-FIG. 5C. In the embodiment, the image beam ML is reflected at a position of the reflecting structure of the third waveguide element 850, and is incident to the second waveguide element 820. The second waveguide element 820 includes a plurality of second light splitting elements 831. The image beam ML has the trans-reflective optical effect at the positions of the second light splitting elements 831, and leaves the second waveguide element 820. In the embodiment, the image beam ML leaving the second waveguide element 820 enters the projection target P, where the projection target P is, for example, at a position of an eye of the user. Moreover, the quantities of the first light splitting elements 811 and the second light splitting elements 831 are not limited to the quantities shown in FIG. 4, and the quantities of the light splitting elements configured in the first waveguide element 810 and the second waveguide element 820 may be designed according to different product requirements, and are not limited by the invention.

In the embodiment, since the first light splitting elements 811 and the second light splitting elements 831 respectively have coating films, and the coating films are only pervious to the image beam ML incident within a specific incident angle range, when the image beam ML is incident to the first light splitting elements 811 and the second light splitting elements 831 in an excessive large incident angle during the process of being transmitted in the first waveguide element 810 and the second waveguide element 820, a part of the image beam ML is reflected by the first light splitting elements 811 and the second light splitting elements 831. The unexpected reflected image beam ML is continually transmitted in the first waveguide element 810 and the second waveguide element 820, and in case that the image beam ML is subsequently incident to the light splitting elements in a smaller angle, the image beam ML is obliquely guided to the eye of the user in a direction opposite to the aforementioned expected direction. Now, besides that the user may view an original expected image frame, the user may also view a mirrored unexpected image frame. Therefore, the user is easy to feel a ghost phenomenon of the image frame or the image frame is blurred during the process of using the HMD device.

Figure 5A:
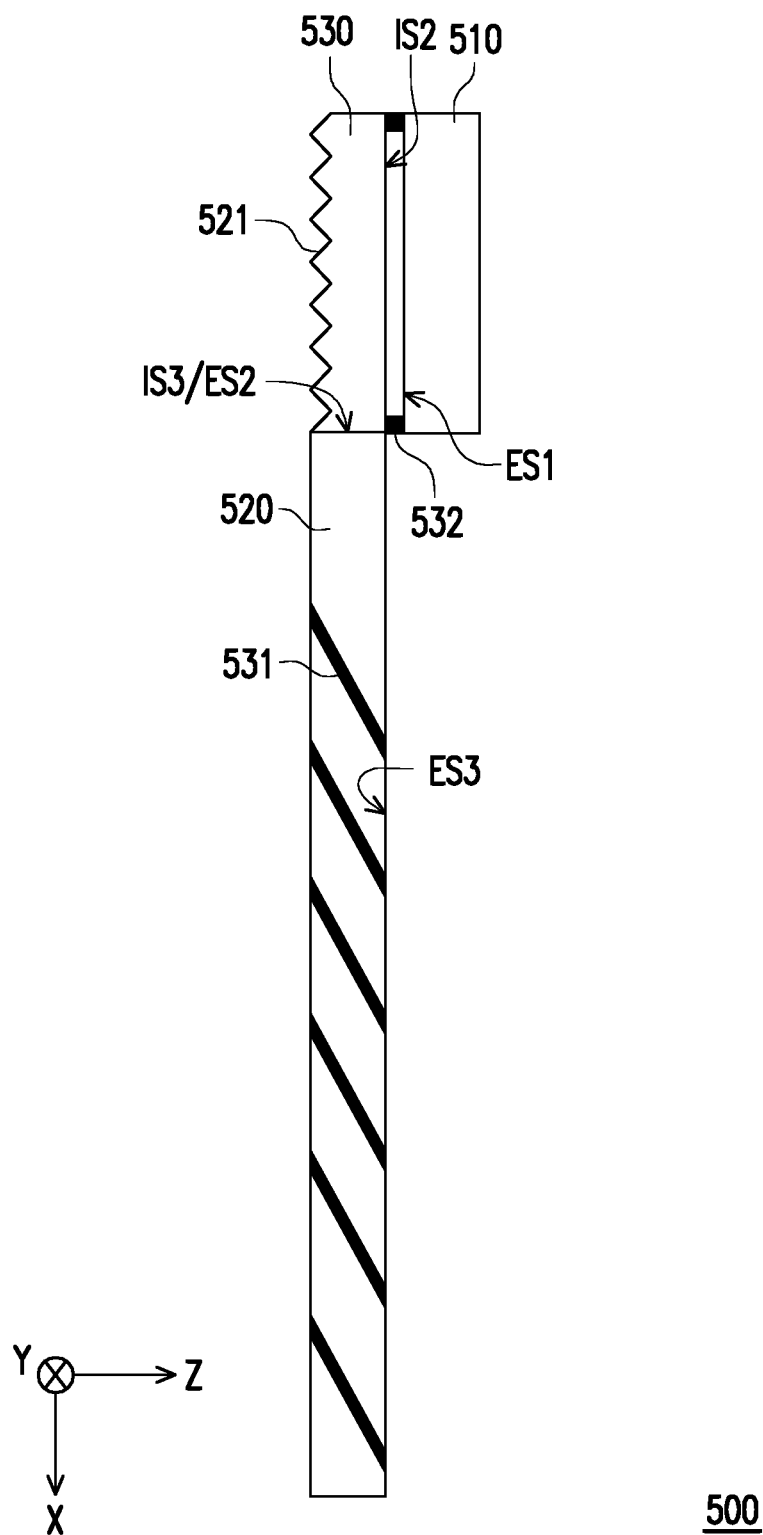
FIG. 5A is a schematic diagram of a HMD device according to an embodiment of the invention.

FIG. 5A is a schematic diagram of a HMD device according to an embodiment of the invention. Referring to FIG. 5A, in the embodiment, the HMD device 500 includes a first waveguide element 510, a second waveguide element 520 and a third waveguide element 530, where the second waveguide element 520 includes a plurality of second a plurality of second light splitting elements 531. In the embodiment, the first waveguide element 510 is disposed beside the third waveguide element 530. The first waveguide element 510 may be attached to the third waveguide element 530, or the first waveguide element 510 and the third waveguide element 530 may be adhered through a transparent adhesive material, or fixing members 532 (for example, spacers or adhesive materials or pads) may be disposed at the periphery of the first waveguide element 510 and the third waveguide element 530 to form a gap there between, where the gap may be a tiny air gap. Moreover, a first light exiting surface ES1 faces a second light incident surface IS2. The second light incident surface IS2 is connected to a second light exiting surface ES2. The third waveguide element 530 may be attached to the second waveguide element 520, or the third waveguide element 530 and the second waveguide element 520 may be adhered through the transparent adhesive material. Therefore, a third light incident surface IS3 is connected to the second light exiting surface ES2. In the embodiment, the third waveguide element 530 includes a reflecting structure 521. The reflecting structure 521 may be composed of a plurality of optical microstructures, and the optical microstructures may be a plurality of reflecting surfaces periodically arranged in a tilt configuration.

Moreover, a purpose of the aforementioned air gap is that when the image beam ML with a large incident angle is incident to the first waveguide element 510, a situation that a part of the image beam ML directly penetrates through the first waveguide element 510 is avoided, such that the part of the image beam ML is transmitted in the first waveguide element 510 in a total reflection manner. Another purpose of the air gap is that a part of the image beam ML is reflected towards the second light incident surface IS2 by the reflecting structure 521, and due to the air gap, a part of the image beam ML has the total reflection at the second light incident surface IS2, and the part of the image beam ML is guided to the second waveguide element 520.

In the embodiment, the image beam ML is incident to the third waveguide element 530 through the first light exiting surface ES1 of the first waveguide element 510, and is incident to the third waveguide element 530 through the second light incident surface IS2. The image beam ML coming from the second light incident surface IS2 is reflected by the reflecting structure 521, and leaves the third waveguide element 530 through the second light exiting surface ES2. The image beam ML is incident to the second waveguide element 520 through the third light incident surface IS3, and leaves the second waveguide element 520 through a third light exiting surface ES3.

In the embodiment, materials of the third waveguide element 530 and the second waveguide element 520 may be different. For example, the material of the third waveguide element 530 may be a plastic material, and the material of the first waveguide element 510 and the second waveguide element 520 may be glass, though the invention is not limited thereto. In an embodiment, the third waveguide element 530 and the second waveguide element 520 may have the same material and may be a structure formed integrally. In the embodiment, the respective materials of the first waveguide element 510, the third waveguide element 530 and the second waveguide element 520 may be determined according to different reflection requirements or product designs.

Figure 5B:
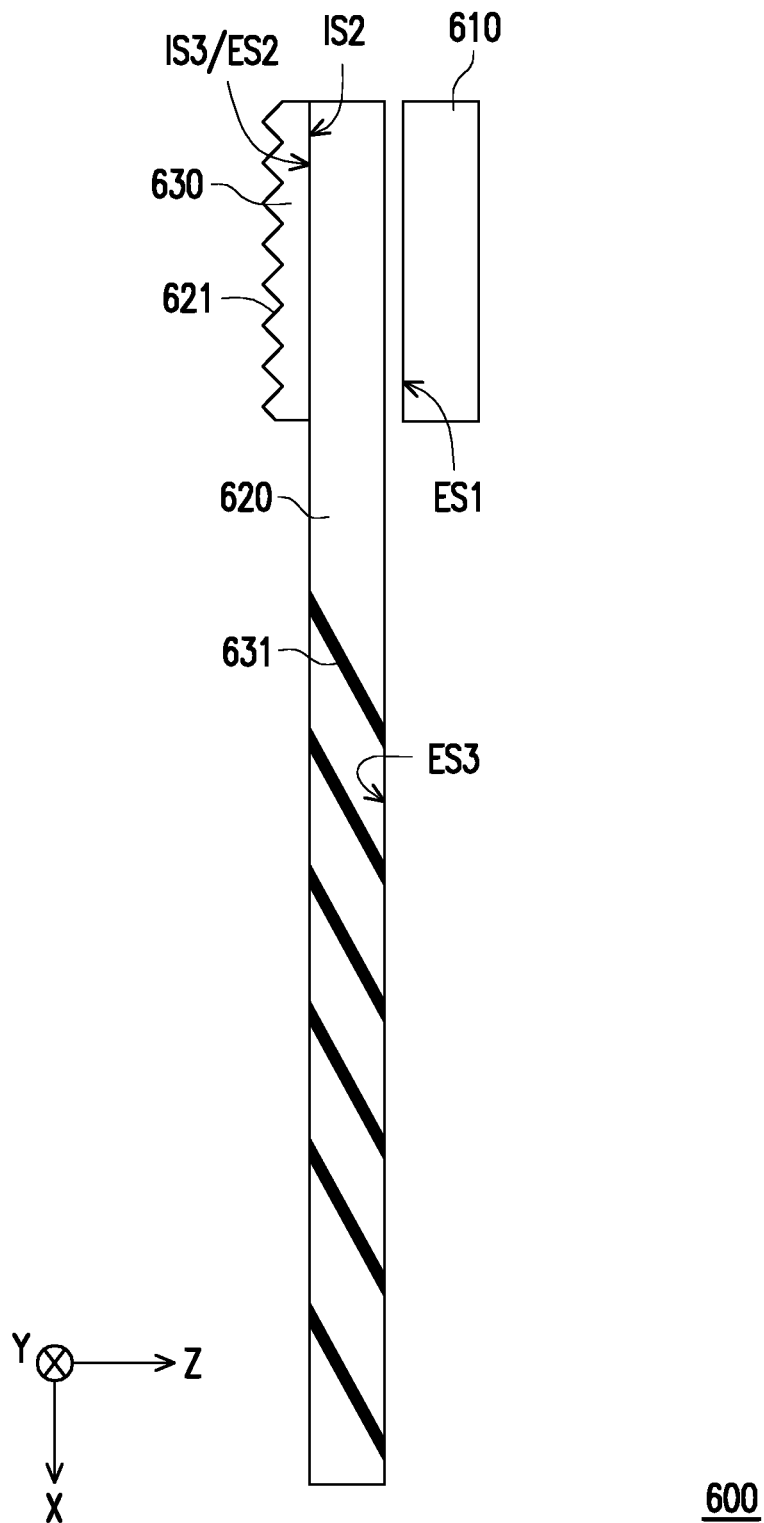
FIG. 5B is a schematic diagram of a HMD device according to an embodiment of the invention.

FIG. 5B is a schematic diagram of a HMD device according to an embodiment of the invention. Referring to FIG. 5B, in the embodiment, the HMD device 600 includes a first waveguide element 610, a third waveguide element 630 and a second waveguide element 620, where the second waveguide element 620 includes a plurality of second a plurality of second light splitting elements 631. In the embodiment, the first waveguide element 610 is disposed beside the second waveguide element 620. The first waveguide element 610 may be attached to the second waveguide element 620, or the first waveguide element 610 and the second waveguide element 620 may be adhered through a transparent adhesive material, or mechanism members (for example, spacers or adhesive materials) may be disposed at the periphery of the first waveguide element 610 and the second waveguide element 620 to form a gap there between, where the gap may be a tiny air gap. Therefore, on a transmission path of the image beam ML, the image beam ML penetrates through the second waveguide element 620 through the first light exiting surface ES1, and is transmitted to the third waveguide element 630. Moreover, the first light exiting surface ES1 faces the second light incident surface IS2. The second light incident surface IS2 is connected to the second light exiting surface ES2. The third waveguide element 630 may be attached to the second waveguide element 620, or the third waveguide element 630 and the second waveguide element 620 may be adhered through the transparent adhesive material. Therefore, the third light incident surface IS3 is connected to the second light exiting surface ES2. The second light incident surface IS2 and the third light incident surface IS3 face the first light exiting surface ES1. In the embodiment, the third waveguide element 630 includes a reflecting structure 621. The reflecting structure 621 may be composed of a plurality of optical microstructures, and the optical microstructures may be a plurality of reflecting surfaces periodically arranged in a tilt configuration.

In the embodiment, the image beam ML is incident to the second waveguide element 620 through the first light exiting surface ES1 of the first waveguide element 610, and is incident to the third waveguide element 630 through the second light incident surface IS2 after passing through the second waveguide element 620. The image beam ML coming from the second light incident surface IS2 is reflected by the reflecting structure 621, and leaves the third waveguide element 630 through the second light exiting surface ES2. The image beam ML is incident to the second waveguide element 620 through the third light incident surface IS3, and leaves the second waveguide element 620 through the third light exiting surface ES3.

In the embodiment, materials of the third waveguide element 630 and the second waveguide element 620 may be different. For example, the material of the third waveguide element 630 may be a plastic material, and the material of the first waveguide element 610 and the second waveguide element 620 may be glass, though the invention is not limited thereto. In an embodiment, the third waveguide element 630 and the second waveguide element 620 may have the same material and may be a structure formed integrally. In the embodiment, the respective materials of the first waveguide element 610, the third waveguide element 630 and the second waveguide element 620 may be determined according to different reflection requirements or product designs.

Figure 5C:
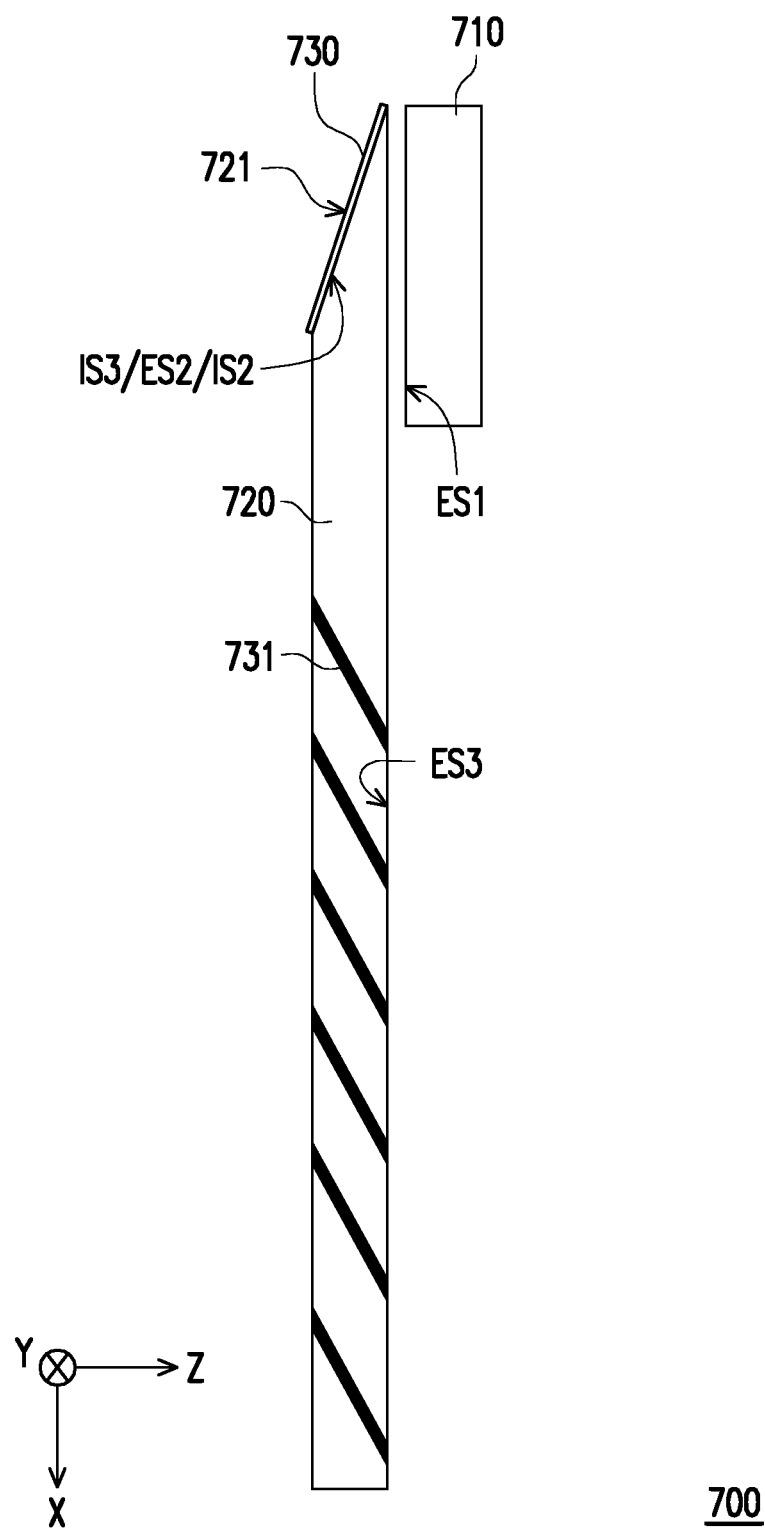
FIG. 5C is a schematic diagram of a HMD device according to an embodiment of the invention.

FIG. 5C is a schematic diagram of a HMD device according to an embodiment of the invention. Referring to FIG. 5C, in the embodiment, the HMD device 700 includes a first waveguide element 710, a third waveguide element 730 and a second waveguide element 720, where the second waveguide element 720 includes a plurality of second a plurality of second light splitting elements 731. In the embodiment, the first waveguide element 710 is disposed beside the second waveguide element 720. The first waveguide element 710 may be attached to the second waveguide element 720, or the first waveguide element 710 and the second waveguide element 720 may be adhered through a transparent adhesive material, or fixing members (for example, spacers or adhesive materials shown in FIG. 5A) may be disposed at the periphery of the first waveguide element 710 and the second waveguide element 720 to form a gap there between, where the gap may be a tiny air gap. Therefore, the first light exiting surface ES1 faces the second light incident surface IS2 through the second waveguide element 720. The second light incident surface IS2 is connected to the second light exiting surface ES2. The third waveguide element 730 is obliquely disposed beside the second waveguide element 720, so that the second light incident surface IS2, the second light exiting surface ES2 and the third light incident surface IS3 have a tilt angle relative to the third light exiting surface ES3. The third waveguide element 730 may be attached to the second waveguide element 720, or the third waveguide element 730 and the second waveguide element 720 are adhered through the transparent adhesive material. Therefore, the third light incident surface IS3 is connected to the second light exiting surface ES2. In the embodiment, the third waveguide element 730 includes a reflecting structure 721 and a transparent layer. The third waveguide element 730 is a reflecting unit, and the reflecting structure 721 may be a reflecting mirror or a reflective coating layer.

In the embodiment, the image beam ML is incident to the second waveguide element 720 through the first light exiting surface ES1 of the first waveguide element 710, and is incident to the third waveguide element 730 through the second light incident surface IS2 after passing through the second waveguide element 720. The image beam ML coming from the second light incident surface IS2 is reflected by the reflecting structure 721, and leaves the third waveguide element 730 through the second light exiting surface ES2. The image beam ML is incident to the second waveguide element 720 through the third light incident surface IS3, and leaves the second waveguide element 720 through the third light exiting surface ES3.

In the embodiment, materials of the first waveguide element 710, the third waveguide element 730 and the second waveguide element 720 may all be a glass material, though the invention is not limited thereto. In an embodiment, the third waveguide element 730 may be a reflecting unit made of a plastic material. Moreover, the respective materials of the first waveguide element 710, the third waveguide element 730 and the second waveguide element 720 may be determined according to different reflection requirements or product designs.

Figure 6A:
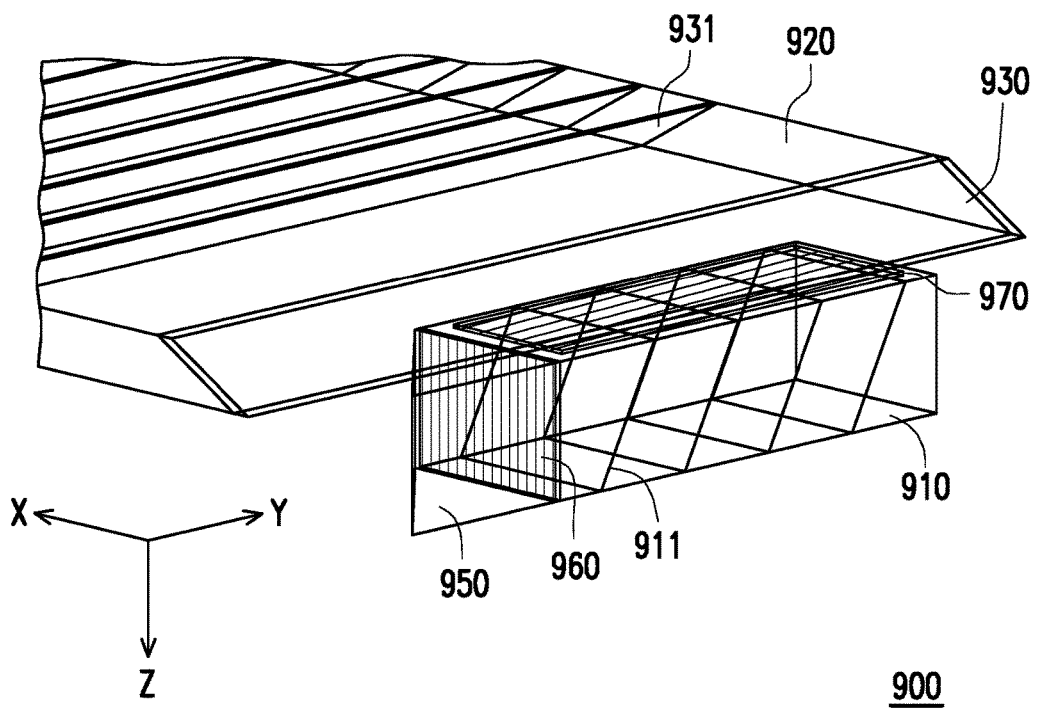
FIG. 6A is a schematic diagram of a HMD device according to another embodiment of the invention.

FIG. 6A is a schematic diagram of a HMD device according to another embodiment of the invention. Referring to FIGS. 1-4 and FIG. 6A, in the embodiment, the HMD device 900 includes a first waveguide element 910, a third waveguide element 930, a second waveguide element 920 and a reflecting element 950. The reflecting element 950 is used for receiving the image beam ML provided by the display device, and the reflecting element 950 may be a prism (not shown) having a reflecting layer, and the image beam ML provided by the display device is incident to the reflecting element 950 along the X-axis direction, and the reflecting layer of the reflecting element 950 reflects the image beam ML to enter the first waveguide element 910 along the Y-axis direction. For the convenience of description, the third waveguide element 930 of the embodiment adopts the design of the reflecting structure of the second waveguide element of the embodiment of FIG. 5C, though the invention is not limited thereto. The design of the reflecting structure of the second waveguide element of the embodiments of FIG. 5A and FIG. 5B may also be adopted.

In the embodiment, the image beam ML provided by the display device of the invention may only have a single polarized direction. For example, when the image beam ML is reflected by the reflecting element 950 to enter the first waveguide element 910, a polarizer 960 may be applied between the display device and the first waveguide element 910, between the display device and the reflecting element 950, or between the reflecting element 950 and the first waveguide element 910, such that the image beam ML incident to the first waveguide element 910 from the display device is only the light having a P-polarized direction (the direction of the third axis Z), and the image beam ML is incident to the second waveguide element 920 from the first waveguide element 910 through the reflecting structure of the third waveguide element 930, and based on an optical definition of the basic polarized light of this field, it is known that the light with the P-polarized direction is converted into the light with an S-polarize direction (the direction of the second axis X). Therefore, in the first waveguide element 910, only the image beam with the single polarized direction is transmitted, and the respective coating films of the first light splitting elements 911 and the second light splitting elements 931 may be designed corresponding to the image beam having the single polarized direction.

In another embodiment, the HMD device 900 of the embodiment may further include a phase delay sheet 970. In the embodiment, the polarizer 960 may be disposed between the display device and the first waveguide element 910, or between the reflecting element 950 and the first waveguide element 910, such that the image beam incident to the first waveguide element 910 from the reflecting element 950 may only have the light with the S-polarized direction. Moreover, the phase delay sheet 970 may be disposed between the first waveguide element 910 and the third waveguide element 930 (and the phase delay sheet 970 may also be disposed between the second waveguide element 920 and the first waveguide element 910), such that the image beam incident to the second waveguide element 920 from the first waveguide element 910 may be the light with the S-polarized direction. Therefore, in the HMD device 900, by configuring the polarizer 960 and the phase delay sheet 970, transmission of the unexpected reflected light in the first waveguide element 910 and the second waveguide element 920 is effectively mitigated.

Figure 6B:
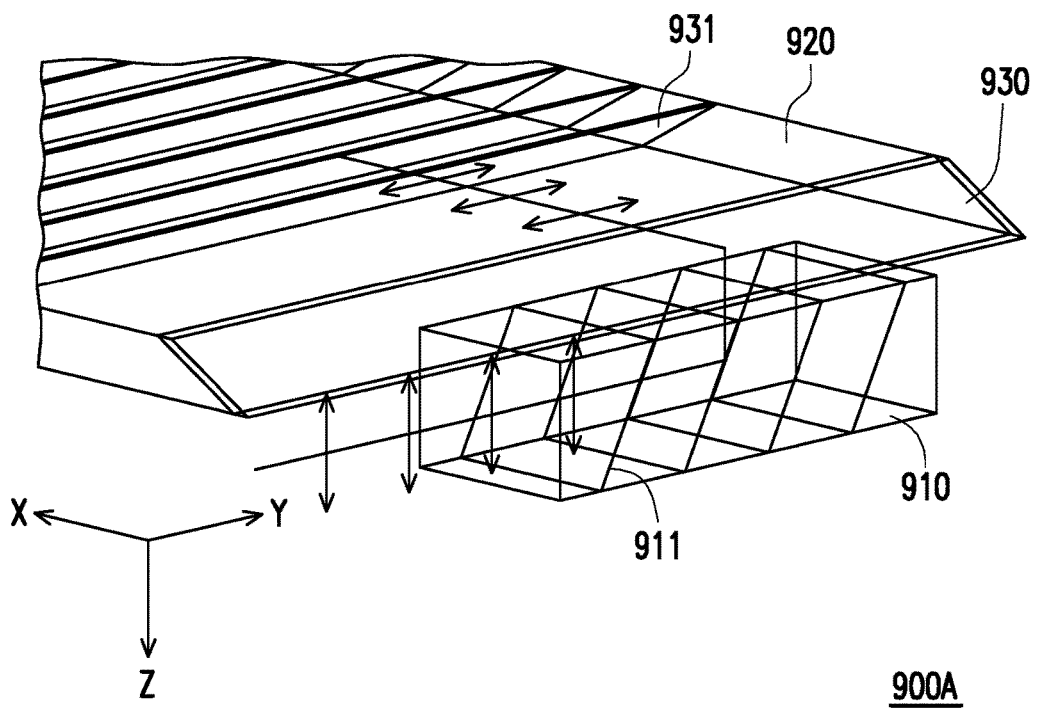
FIG. 6B is a schematic diagram of a HMD device according to another embodiment of the invention.

FIG. 6B is a schematic diagram of a HMD device 900A according to another embodiment of the invention. The image beam ML provided by the display device 830 may only have the single polarized direction. For example, the image beam ML directly incident to the first waveguide element 910 may have the light with the P-polarized direction (the direction of the third axis Z), and the image beam ML is incident to the second waveguide element 920 from the first waveguide element 910 through the reflecting structure, and is naturally converted into the image beam ML with the S-polarized direction (the direction of the first axis Y) based on a basic optical reflection effect. Therefore, only the image beam ML with the single polarized direction is transmitted in the first waveguide element 910, and the respective coating films of the first light splitting elements 911 and the second light splitting elements 931 may be designed corresponding to the image beam ML having the single polarized direction. Therefore, in the HMD device 900A of the embodiment, transmission of the unexpected reflected light in the first waveguide element 910 and the second waveguide element 920 is effectively mitigated. In the embodiment, the first stop PA1 is also located in the first waveguide element 910, and the second stop PA2 is located at the projection target P. Moreover, a position of the first stop PA1 in the first waveguide element 910 is complied with a condition that the distance D1 is greater than or equal to the distance D2.

Figure 7:
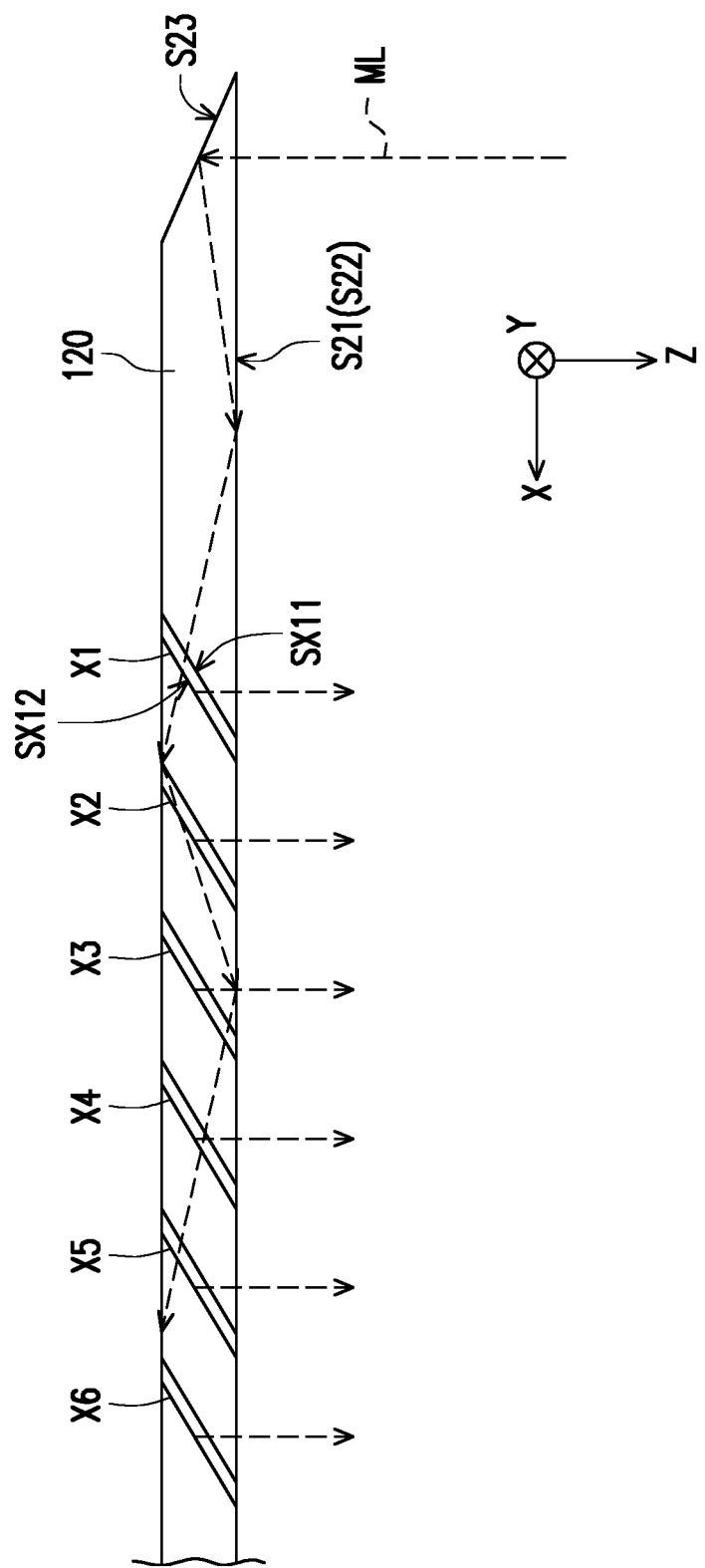
FIG. 7 is a top view of a second waveguide element of FIG. 1.
Figure 8:
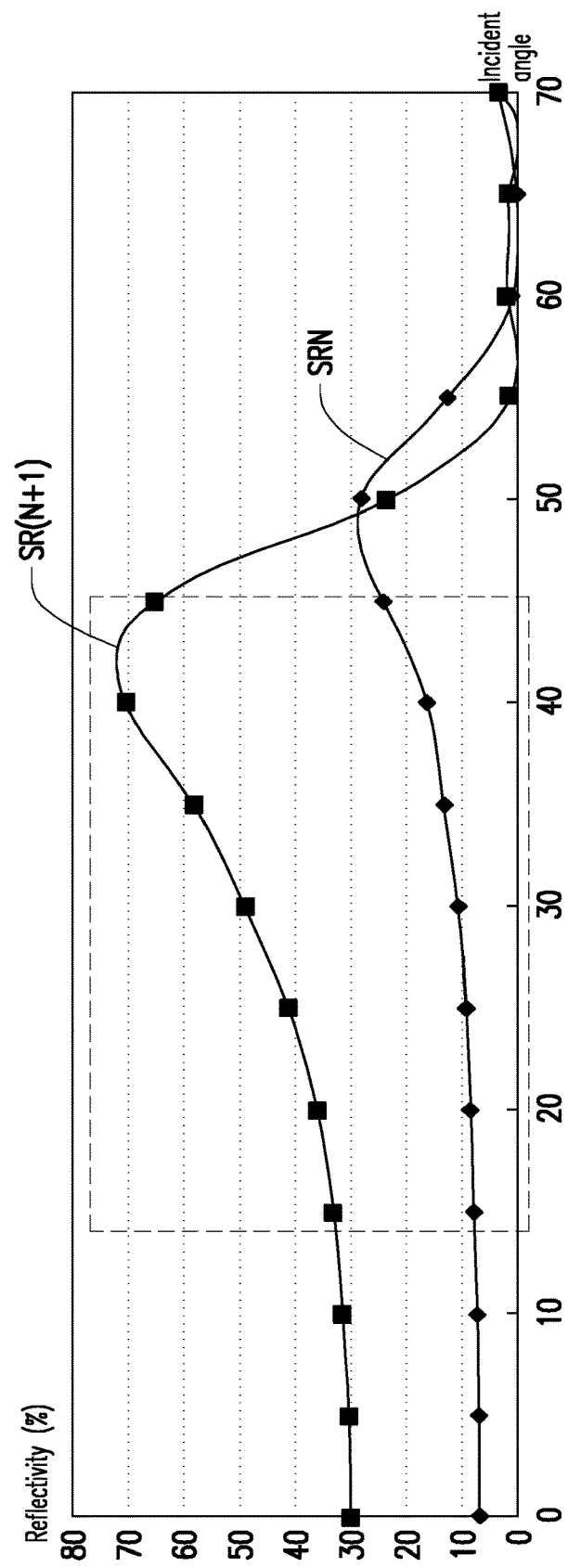
FIG. 8 is a schematic diagram of reflectivity distribution curves of reflectivities of a diffusion coating film relative to incident angles of an image beam according to an embodiment of the invention.

FIG. 7 is a top view of the second waveguide element of FIG. 1. FIG. 8 is a schematic diagram of reflectivity distribution curves of reflectivities of a diffusion coating film relative to incident angles of the image beam according to an embodiment of the invention. In FIG. 8, the reflectivity distribution curves of the reflectivities of the diffusion coating film relative to the incident angles of the image beam, for example, take a wavelength of 520 nm as an example for description, though the invention is not limited thereto. Moreover, the reflectivity distribution curves of FIG. 8 are only used as an example, and are not used for limiting the invention. Referring to FIG. 7 to FIG. 8, in the embodiment, each of the second light splitting elements X1, X2, X3, X4, X5, X6 in the second waveguide element 120 includes a first surface and a second surface opposite to the first surface, and one of the first surface and the second surface may include the diffusion coating film, for example, the first surface includes the diffusion coating film. Taking the second light splitting element X1 as an example, the second surface SX12 is opposite to the first surface SX11, and the first surface SX11 includes the diffusion coating film. In the embodiment, the image beam ML is incident to each of the second light splitting elements from the first surface of each of the second light splitting elements, and an incident angle of the image beam ML incident to each of the second light splitting elements ranges between 15 degrees and 45 degrees, such that a part of the image beam ML is reflected to a pupil P by the diffusion coating film, where an included angle between each of the second light splitting elements in the second waveguide element 120 and the second light exiting surface S22 is 30 degree, though the invention is not limited thereto. In the second waveguide element 120, the polarized direction of the image beam ML is a second polarized direction (for example, an S-direction polarized light). In the embodiment, the reflectivity of the diffusion coating film is, for example, complied with the reflectivity distribution curve of FIG. 8. When the incident angle is between 15 degrees and 45 degrees, the reflectivity of an $N^{th}$ second light splitting element is smaller than or equal to the reflectivity of an $(N+1)^{th}$ second light splitting element, where N is an integer greater than or equal to 1. In FIG. 8, a curve SR(N+1) is, for example, the reflectivity distribution curve of the $(N+1)^{th}$ second light splitting element, and a curve SRN is, for example, the reflectivity distribution curve of the $N^{th}$ second light splitting element. For example, the reflectivity of the $1^{st}$ second light splitting element X1 is smaller than or equal to the reflectivity of the $2^{nd}$ second light splitting element X2, though the invention is not limited thereto.

Figure 9:
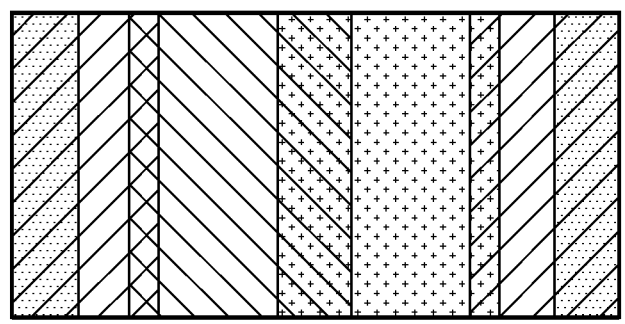
FIG. 9 is a schematic diagram of an image frame produced at a projection target by an image beam of the embodiment of FIG. 7.

FIG. 9 is a schematic diagram of an image frame produced at the projection target by the image beam of the embodiment of FIG. 7. Referring to FIG. 7 and FIG. 9, in the embodiment, the image frame formed at the projection target P is produced by the image beams ML reflected by each of the second light splitting elements, i.e. the image frame of a horizontal direction (the second direction X) viewed by human eye. Therefore, the image frame produced at the projection target P by the image beam ML reflected by the different second light splitting elements is partially overlapped or connected, and if the image frame has a gap therein, the image viewed by the human eye has a black area. Therefore, as shown in FIG. 9, for example, different blocks of the image frame produced at the projection target P are contributed by the image beam ML reflected by different second light splitting elements, and image overlapping or image connection are occurred at a part of the blocks. Based on the design method of the diffusion coating film of the embodiment, i.e. the reflectivity of the $N^{th}$ second light splitting element in the second light splitting elements is smaller than or equal to the reflectivity of the $(N+1)^{th}$ second light splitting element in the second light splitting elements, even if a part of the blocks is overlapped, the image frame at the projection target P is still maintained uniform and has good display quality.

Figure 10:
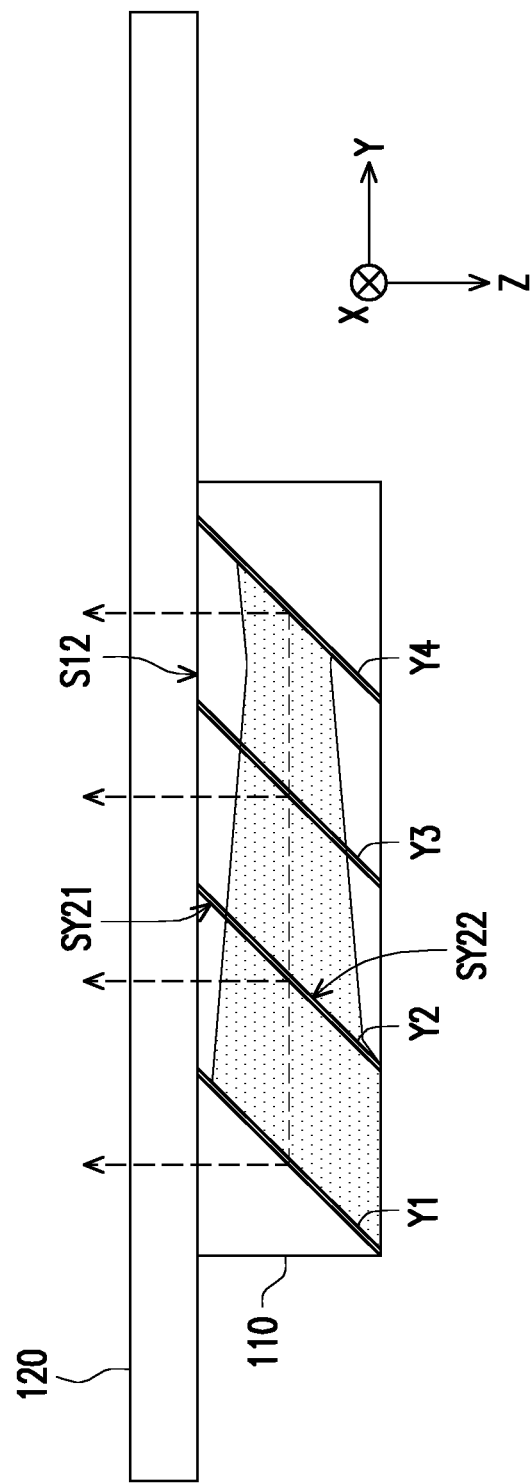
FIG. 10 is a side view of a first waveguide element of FIG. 1.

FIG. 10 is a side view of the first waveguide element of FIG. 1. Referring to FIG. 10, in the embodiment, each of the first light splitting elements Y1, Y2, Y3, Y4 includes a first surface and a second surface opposite to the first surface, where the first surface includes a diffusion coating film. One of the first surface and the second surface may include the diffusion coating film, and taking the first light splitting element Y1 as an example, the second surface SY22 is opposite to the first surface SY21, and the first surface SY21 includes the diffusion coating film. In the embodiment and referring to FIG. 3, the optical axis A1 of the lens module 140 is parallel to the first direction Y and perpendicular to the visual axis A2 of the projection target P, and the image beam ML is incident to the first surface SY21 of the first light splitting element Y1, and an incident angle thereof is between 30-60 degrees, where an included angle between each of the first light splitting elements of the first waveguide element 110 and the first light exiting surface S12 is 45 degrees, which may be 30 degrees in case of other design, though the invention is not limited thereto. Moreover, the reflectivity of an $M^{th}$ first light splitting element is smaller than or equal to the reflectivity of an $(M+1)^{th}$ first light splitting element, where M is an integer greater than or equal to 1. For example, the reflectivity of the $2^{nd}$ first light splitting element Y2 is smaller than or equal to the reflectivity of the $3^{rd}$ first light splitting element Y3, such that a part of the image beam ML is reflected to the second waveguide element 120 through the diffusion coating film, and the image frame formed at the projection target P is still maintained uniform and has good display quality. In another embodiment, referring to FIG. 2A, the optical axis A1 of the lens module 140 is perpendicular to the first direction Y and parallel to the visual axis A2 of the projection target P, the image beam ML is incident to the first surface SY21 of the first light splitting element, and 1 minus the reflectivity of the $1^{st}$ first light splitting element is smaller than or equal to the reflectivity of the $(M+1)^{th}$ first light splitting element, where M is an integer greater than or equal to 1. For example, 1 minus the reflectivity of the $1^{st}$ first light splitting element Y1 is smaller than or equal to the reflectivity of the $2^{nd}$ first light splitting element. In this way, a part of the image beam ML is reflected to the second waveguide element 120 by the diffusion coating film, and the image frame formed at the projection target P is still maintained uniform and has good display quality.

Figure 11:
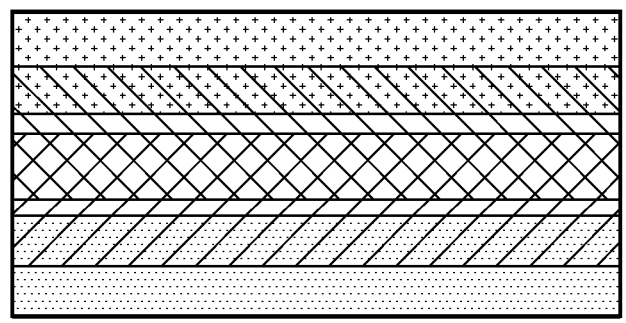
FIG. 11 is a schematic diagram of an image frame produced at a projection target by an image beam of the embodiment of FIG. 10.

FIG. 11 is a schematic diagram of an image frame produced at the projection target by the image beam of the embodiment of FIG. 10. Referring to FIG. 10 and FIG. 11, in the embodiment, the image frame formed at the projection target P is produced by the image beam ML reflected by each of the first light splitting elements. In other words, the image frame of a vertical direction (the first direction Y) viewed by human eye. Therefore, the image frame produced at the projection target P by the image beam ML reflected by the different first light splitting elements is partially overlapped or connected, i.e. the image beam ML reflected by the different second light splitting elements produces an image frame on the projection target P, where the image frame is formed by the partially overlapped image beam ML, or the image beam ML reflected by the different second light splitting elements produces an image frame on the projection target P, where the image frame is formed by the partially connected image beam ML.

In other embodiments, the image beam ML reflected by the different first light splitting elements and the image beam ML reflected by the different second light splitting elements produce an image frame on the projection target P, and the image frame is formed by the partially overlapped image beam ML. In another embodiment, the image beam ML reflected by the different first light splitting elements and the image beam ML reflected by the different second light splitting elements produce an image frame on the projection target P, and the image frame is formed by the partially connected image beam ML. If the image frame has a gap therein, the image viewed by the human eye has a black area. Therefore, as shown in FIG. 11, different blocks of the image frame produced at the projection target P are contributed by the image beam ML reflected by different first light splitting elements, and image overlapping or image connection are occurred at a part of the blocks, such that the image frame at the projection target P is still maintained uniform and has good display quality.

Figure 12A:
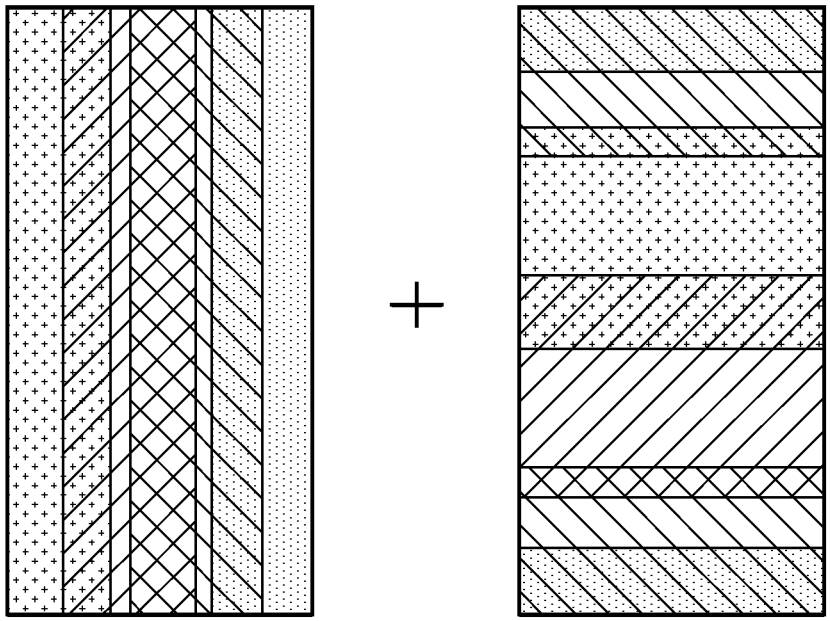
FIG. 12A is a schematic diagram of superposing image frames produced at the projection target by the image beam of the embodiments of FIG. 9 and FIG. 11.

FIG. 12A is a schematic diagram of superposing image frames produced at the projection target by the image beam of the embodiments of FIG. 9 and FIG. 11. Referring to FIG. 9, FIG. 11 and FIG. 12A, the image beam ML respectively reflected by each of the second light splitting elements forms the image frame of the horizontal direction (the second direction X) at the projection target P, and the image beam ML respectively reflected by each of the first light splitting elements forms the image frame of the vertical direction (the first direction Y) at the projection target P, and the two image frames are superposed to form the image frame at the projection target P.

Figure 12B:
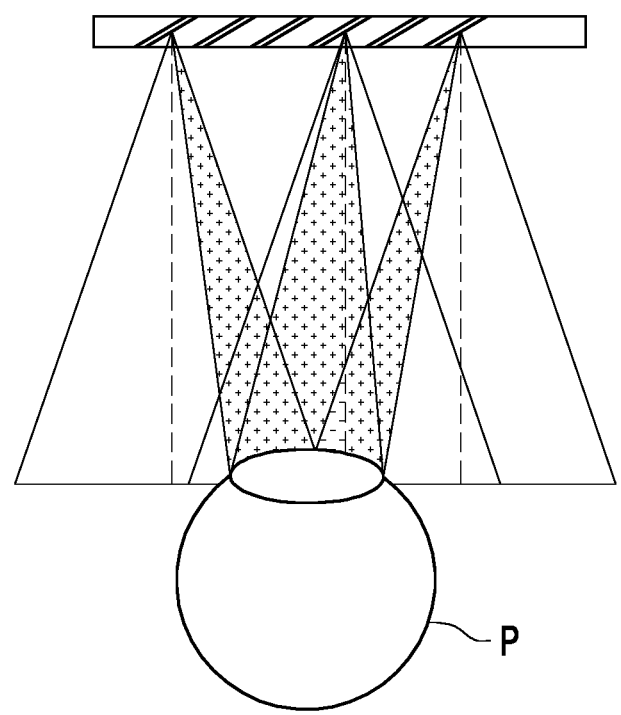
FIG. 12B is a schematic diagram of reflecting image beams to the projection target by different second light splitting elements.

FIG. 12B is a schematic diagram of reflecting the image beam to the projection target by different second light splitting elements. Referring to FIG. 12, it is known that the image beam emits out of the second waveguide element in a diffusion manner through the second light splitting elements, though the position of the projection target P may receive the image beam projected by the second light splitting elements, and the projection target P may receive the partial overlapped image beam or partial adjacent image beam to acquire a clear and integral image.

Figure 13:
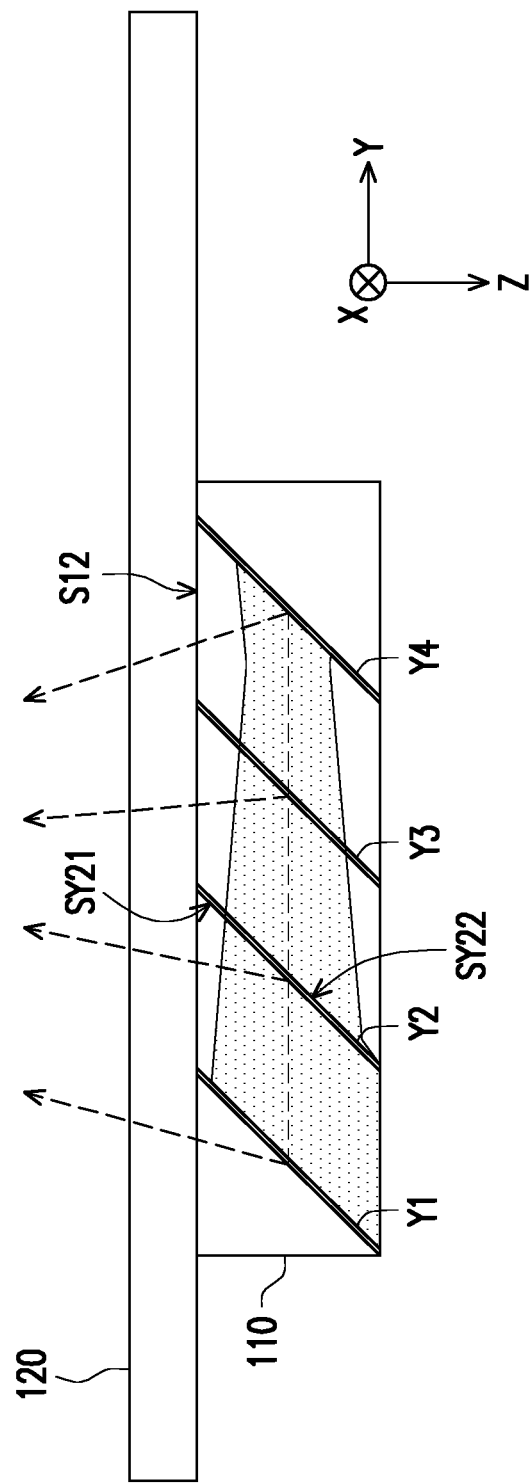
FIG. 13 is a schematic diagram of an image beam incident to a second waveguide element from first light splitting elements according to an embodiment of the invention.
Figure 14A:
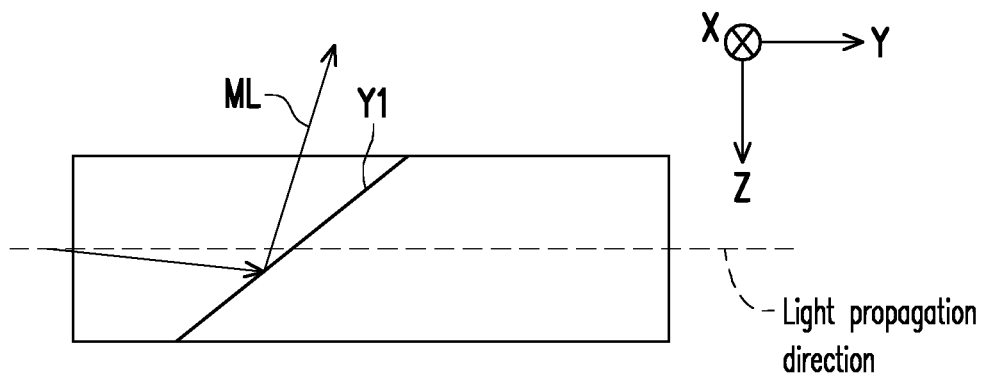
FIG. 14A is a schematic diagram of an image beam incident to a first light splitting element according to an embodiment of the invention.
Figure 14B:
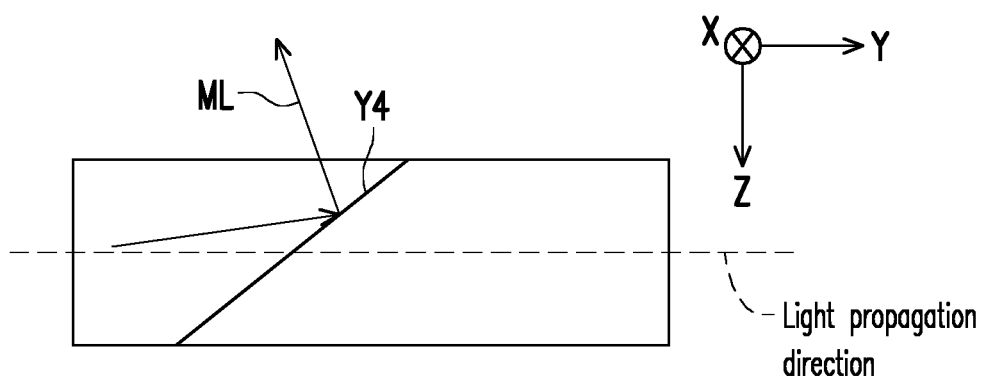
FIG. 14B is a schematic diagram of an image beam incident to the first light splitting element according to an embodiment of the invention.

FIG. 13 is a schematic diagram of the image beam incident to the second waveguide element from the first light splitting elements according to an embodiment of the invention. In FIG. 13, the image beam ML reflected by the different first light splitting elements probably has different incident angles when entering the second waveguide element 120 from the first waveguide element 110. Therefore, regarding the different first light splitting elements, the diffusion coating films thereof may be separately designed. A chief ray of a part of the image beam reflected by the first piece of the first light splitting elements (the first light splitting element Y1) is biased to the last piece of the first light splitting elements (the first light splitting element Y4). A chief ray of a part of the image beam reflected by the last piece of the first light splitting elements (the first light splitting element Y4) is biased to the first piece of the first light splitting elements (the first light splitting element Y1). A direction of the image beam in FIG. 13 is schematic, and the image beam is actually incident to the second waveguide element 120. For example, in FIG. 13, an angle between a transmitting direction (the first direction Y) of the image beam ML and the first light splitting element is the incident angle, which is, for example, 45 degrees, and the incident angle of the image beam ML incident to the first light splitting element is probably greater than, smaller than or equal to 45 degrees (a reference angle). For example, the incident angle of the image beam ML incident to the first light splitting elements Y1, Y2 is probably greater than 45 degrees. Referring to FIG. 14A, FIG. 14A is a schematic diagram of the image beam ML incident to the first light splitting element Y1, where an incident angle thereof is greater than 45 degrees. The incident angle of the image beam ML incident to the first light splitting element Y2 may be deduce by analogy. Therefore, regarding the design of the diffusion coating film of the first light splitting elements Y1, Y2, at a place where the incident angle is greater than 45 degrees, the first light splitting elements Y1, Y2 have reflectivity of 15% and 30% at the region with the incident angle of 47 degrees and 50 degrees, such that the image beam ML reflected to the second waveguide element 120 from the first light splitting elements Y1, Y2 have a larger light flux, and the efficiency of projecting the image beam ML to the projection target P is improved. For another embodiment, the incident angle of the image beam ML incident to the first light splitting elements Y3, Y4 is probably smaller than 45 degrees, as shown in FIG. 14B. FIG. 14B is a schematic diagram of the image beam ML incident to the first light splitting element Y4, where an incident angle thereof is smaller than 45 degrees. The incident angle of the image beam ML incident to the first light splitting element Y3 may be deduce by analogy. Therefore, regarding the design of the diffusion coating film of the first light splitting elements Y3, Y4, at a place where the incident angle is smaller than 45 degrees, the first light splitting elements Y3, Y4 have reflectivity of 40% and 55% at the region with the incident angle of 40 degrees and 43 degrees, such that the image beam ML reflected to the second waveguide element 120 from the first light splitting elements Y3, Y4 have a larger light flux, and the efficiency of projecting the image beam ML to the projection target P is improved.

Therefore, in the embodiment of the invention, by adjusting an optical characteristic of the diffusion coating film on the light splitting elements, the image frame on the projection target P is uniform, and the image beam ML projected to the projection target P has larger light flux.

A plurality of embodiments is provided below to describe an operation method of a HMD device including an illumination system, a display device and a waveguide system.

Figure 15:
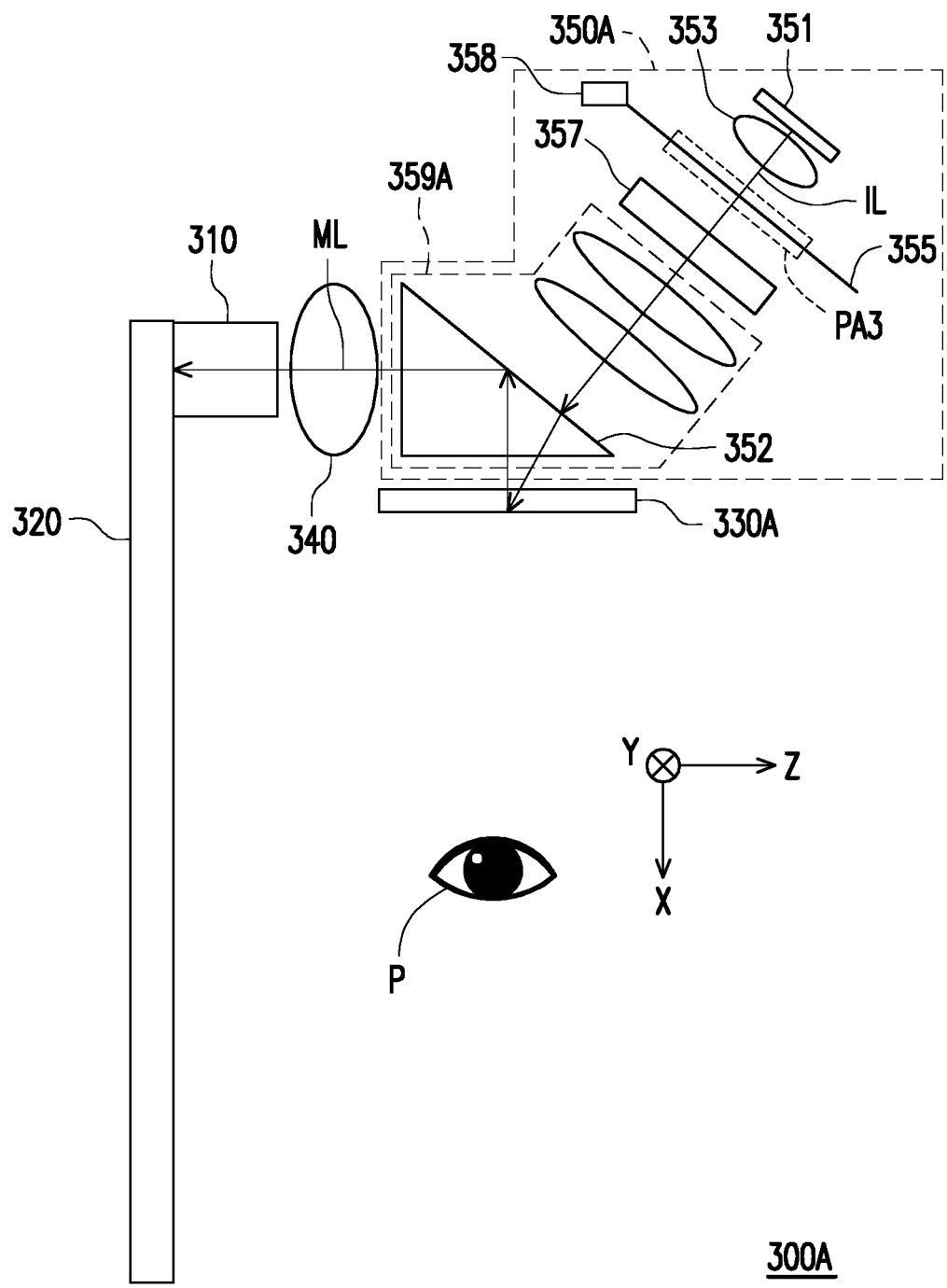
FIG. 15 is a schematic diagram of a HMD device according to an embodiment of the invention.

FIG. 15 is a schematic diagram of a HMD device according to an embodiment of the invention. Referring to FIG. 15, the HMD device 300A of the embodiment includes an illumination system 350A, a display device 330A, a lens module 340 and a waveguide system. The lens module 340 may include one or a plurality of lenses, and the waveguide system includes a first waveguide element 310 and a second waveguide element 320. In the embodiment, the display device 330A, for example, includes a digital light Processing™ (DLP™) projection system, which is used for converting an illumination beam IL coming from the illumination system 350A into the image beam ML. The image beam ML is transmitted to the projection target P through the waveguide system. In the embodiment, enough instructions and recommendations for the operation method of the waveguide system may be learned from the descriptions of the embodiments of FIG. 1 to FIG. 14B.

In the embodiment, the illumination system 350A is used for providing the illumination beam IL to the display device 330A. The illumination system 350A includes an illumination light source 351, a collimation lens set 353, an aperture stop 355, a light uniforming element 357, and a prism module 359A. The illumination light source 351 provides the illumination beam IL. The illumination beam IL is transmitted to the display device 330A through the collimation lens set 353, the aperture stop 355, the light uniforming element 357 and the prism module 359A. In the embodiment, the aperture stop 355 is disposed between the collimation lens set 353 and the light uniforming element 357, and the illumination light source 351 is, for example, a light emitting diode (LED), though the invention is not limited thereto. The light uniforming element 357 is, for example, a lens array. The lens array may be a fly-eye lens array, and the collimation lens set 353 includes one or a plurality of lenses. In the embodiment, the illumination beam IL coming from the illumination light source 351 is converged to a third stop PA3 in the illumination system 350A. The third stop PA3 is located at the aperture stop 355. In the embodiment, the aperture stop 355 may have a driving element 358 (for example, a motor), and the driving element is used for controlling an aperture size of the aperture stop 355, so as to control an area of the third stop PA3. Therefore, the aperture stop 355 may adjust a light flux of the illumination beam IL passing there through. In the embodiment, the prism module 359A includes a prism 352 (a first prism). The illumination beam IL coming from the light uniforming element 357 is transmitted to the display device 330A through the prism 352. In another embodiment, according to a design requirement, the aperture of the aperture stop 355 may have a fixed aperture size.

Figure 16:
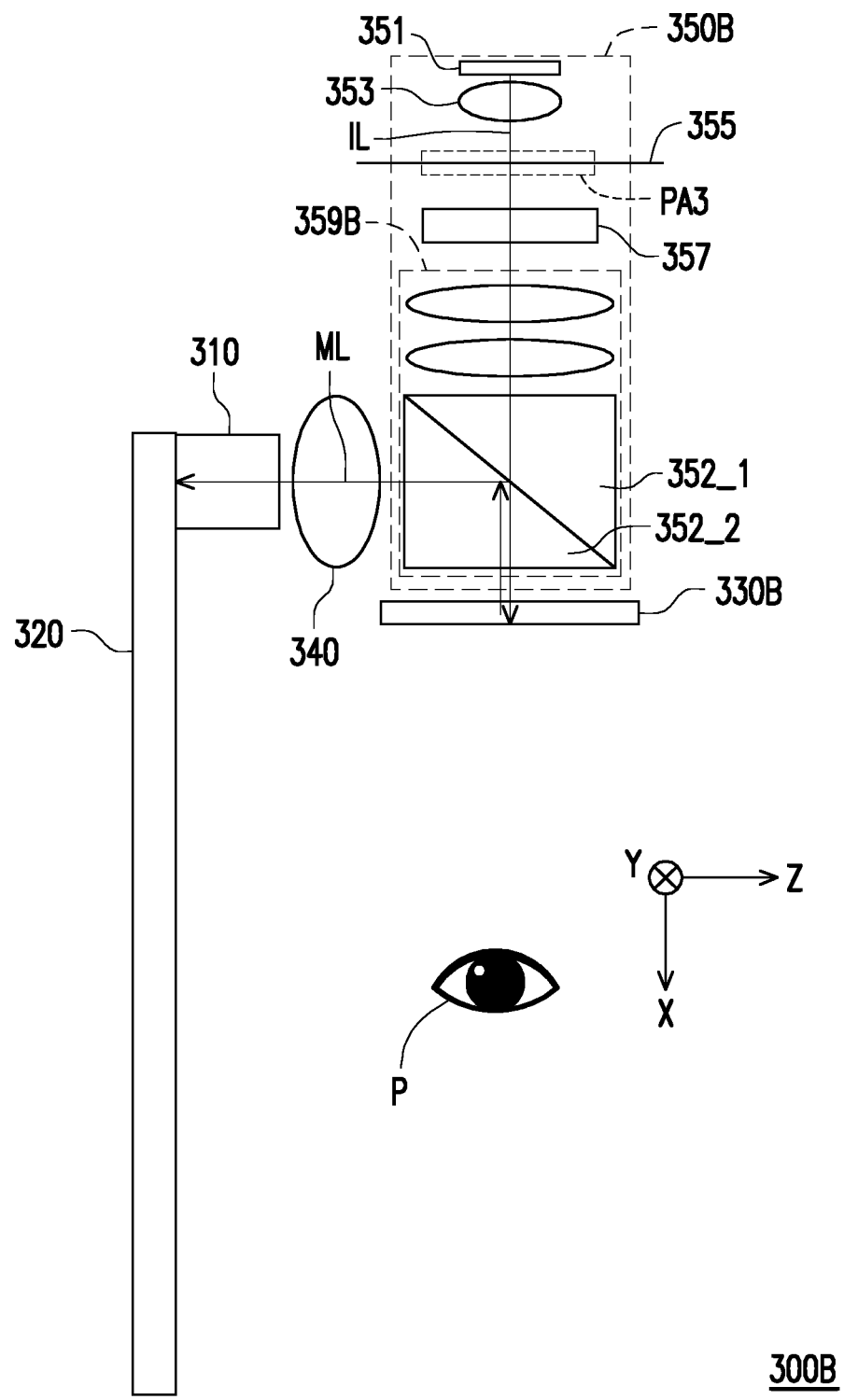
FIG. 16 is a schematic diagram of a HMD device according to an embodiment of the invention.

FIG. 16 is a schematic diagram of a HMD device according to an embodiment of the invention. Referring to FIG. 15 and FIG. 16, the HMD device 300B of the embodiment is similar to the HMD device 300A of FIG. 15, and a main difference there between, for example, lies in designs of the illumination system 350B and the display device 330B.

To be specific, in the embodiment, the display device 330A, for example, includes a liquid crystal on silicon (LCoS) projection system, which is used for converting the illumination beam IL coming from the illumination system 350B into the image beam ML. The image beam ML is transmitted to the projection target P through the waveguide system. In the embodiment, enough instructions and recommendations for the operation method of the waveguide system may be learned from the descriptions of the embodiments of FIG. 1 to FIG. 14B. In the present embodiment, the illumination system 350B is used for providing the illumination beam IL to the display device 330B. The aperture stop 355 is disposed between the collimation lens set 353 and the light uniforming element 357. In the embodiment, the illumination beam IL coming from the illumination light source 351 is converged to the third stop PA3 in the illumination system 350A. The illumination beam IL of the illumination light source 351 may be converted into the illumination beam IL with a single polarity though polarity conversion. The third stop PA3 is located at the aperture stop 355. In the embodiment, the aperture stop 355 may have a driving element. The driving element is used for controlling an aperture size of the aperture stop 355, so as to control an area of the third stop PA3. Therefore, the aperture stop 355 may adjust a light flux of the illumination beam IL passing there through. In the embodiment, the prism module 359B includes a polarizing beam splitter (PBS). The illumination beam IL coming from the light uniforming element 357 is transmitted to the display device 330A through the PBS, and is reflected to the lens module 340.

Figure 17:
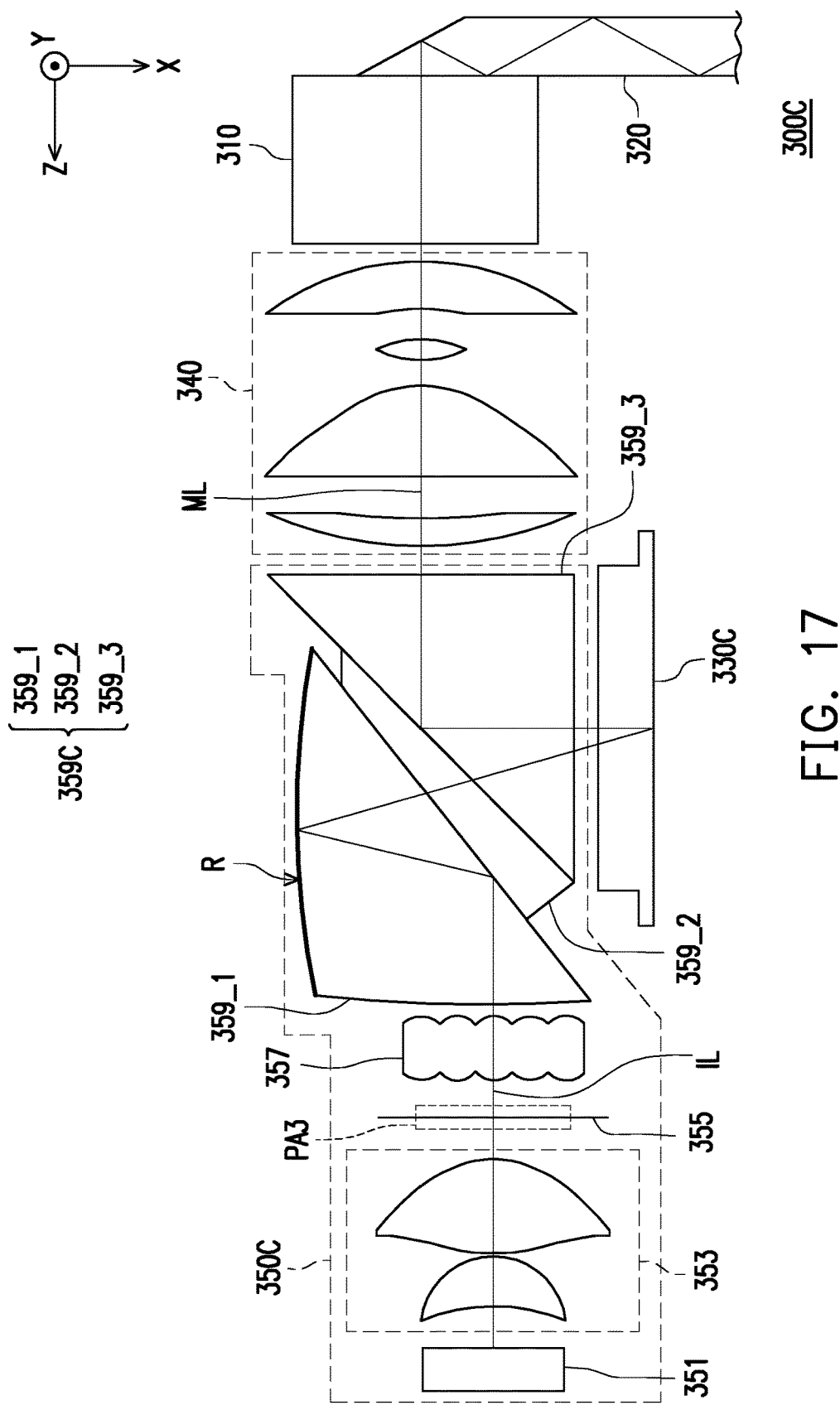
FIG. 17 is a schematic diagram of a HMD device according to an embodiment of the invention.

FIG. 17 is a schematic diagram of a HMD device according to an embodiment of the invention. Referring to FIG. 15 and FIG. 17, the HMD device 300C of the embodiment is similar to the HMD device 300A of FIG. 15, and a main difference there between, for example, lies in a design of the prism module 359C.

To be specific, in the embodiment, the display device 330C, for example, includes a digital light Processing™ (DLP™) projection system, which is used for converting an illumination beam IL coming from the illumination system 350C into the image beam ML. The image beam ML is transmitted to the projection target P through the waveguide system. In the embodiment, enough instructions and recommendations for the operation method of the waveguide system may be learned from the descriptions of the embodiments of FIG. 1 to FIG. 14B. In the embodiment, the prism module 359C includes a first prism 359_1, a second prism 359_2 and a third prism 359_3. The first prism 359_1 has a curved surface, and the curved surface has a reflection layer R. The curved surface is used for reflecting the illumination beam IL coming from the light uniforming element 357. In the embodiment, a tiny air gap is formed between every two prisms. For example, a first gap is located between the first prism 359_1 and the second prism 359_2, and a second gap is located between the second prism 359_2 and the third prism 359_3. The illumination beam IL coming from the light uniforming element 357 is transmitted to the display device 330C through the first prism 359_1, the first gap, the curved surface, the second prism 359_2, the second gap and the third prism 359_3. In an embodiment, the first prism 359_1 may be attached to the second prism 359_2, or the first prism 359_1 and the second prism 359_2 may be adhered through a transparent adhesive. The second prism 359_2 may be attached to the third prism 359_3, or the second prism 359_2 and the third prism 359_3 may be adhered through the transparent adhesive.

In the embodiment of FIG. 15 to FIG. 17, the illumination systems 350A, 350B, 350C have a first F value, and the first F value is determined according to an area size of the third stop PA3. The F value may be a F number. The lens module 340 has a second F value. The HMD devices 300A, 300B, 300C are complied with a condition that the first F value is greater than or equal to the second F value, which mitigate a ghost phenomenon of the image frame. The F value may be defined as $\frac{1}{2}*\sin(\theta)$, where the angle $\theta$ is a cone angle for light incidence.

Figure 18:
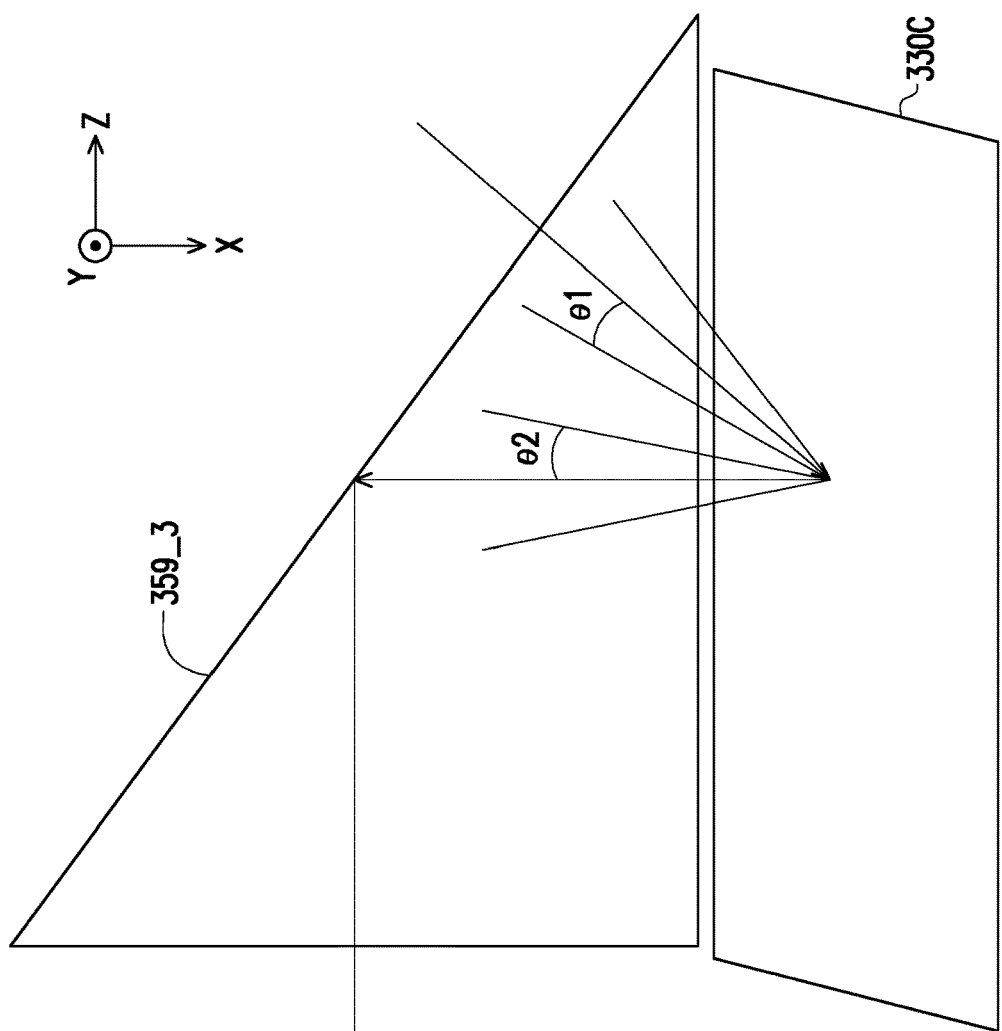
FIG. 18 is a schematic diagram of a part of elements of the HMD device of the embodiment of FIG. 17.

For example, FIG. 18 is a schematic diagram of a part of elements of the HMD device of the embodiment of FIG. 17. For simplicity's sake, only the display device 330C, the third prism 359_3 and the lens module 340 of the HMD device 300C are illustrated in FIG. 18. In the embodiment, the illumination beam IL is incident to the display device 330C, where the display device 330C, for example, includes a digital micromirror device (DMD). The DMD first converts the illumination beam IL into the image beam ML, and reflects the image beam ML to the third prism 359_3. The third prism 359_3 then reflects the image beam ML to the lens module 340. In the embodiment, the cone angle of the illumination beam IL incident to the display device 330C is, for example, θ1, and the first F value of the illumination system 350C may be defined as $\frac{1}{2}*\sin(\theta 1)$. In the embodiment, the lens module 340 receives the image beam ML coming from the display device 330C, where the cone angle thereof is, for example, θ2. The second F value of the lens module 340 may be defined as $\frac{1}{2}*\sin(\theta 2)$.

In the embodiment, according to manufacturer's design, the second F value of the lens module 340 is preset, i.e. the required incident angle θ2 is learned, so that the aperture size of the aperture stop 355 may be adjusted to control a size of the third stop PA3, and the size of the third stop PA3 influences a magnitude of the cone angle θ1 of the illumination beam IL incident to the display device 330C. Namely, after the second F value of the lens module 340 is determined, a magnitude of the first F value of the illumination system 350C may be controlled through the aperture stop 355, such that the HMD device 300C may be complied with the condition that the first F value is greater than or equal to the second F value. In an embodiment, the aperture of the aperture stop 355 may have a fixed aperture size, and through a design of the second F value of the lens module 340, the first F value of the illumination system 350C is designed to make the HMD device 300C to be complied with the condition that the first F value is greater than or equal to the second F value. In the embodiments of FIG. 15 and FIG. 16, the illumination systems 350A, 350B may also be adjusted according to the above method, such that the HMD devices 300A, 300B are complied with the condition that the first F value is greater than or equal to the second F value. Therefore, during the process that the user uses the HMD devices 300A, 300B, the ghost phenomenon of the image frame is mitigated or a phenomenon that the image frame becomes blurred is avoided.

Figure 19:
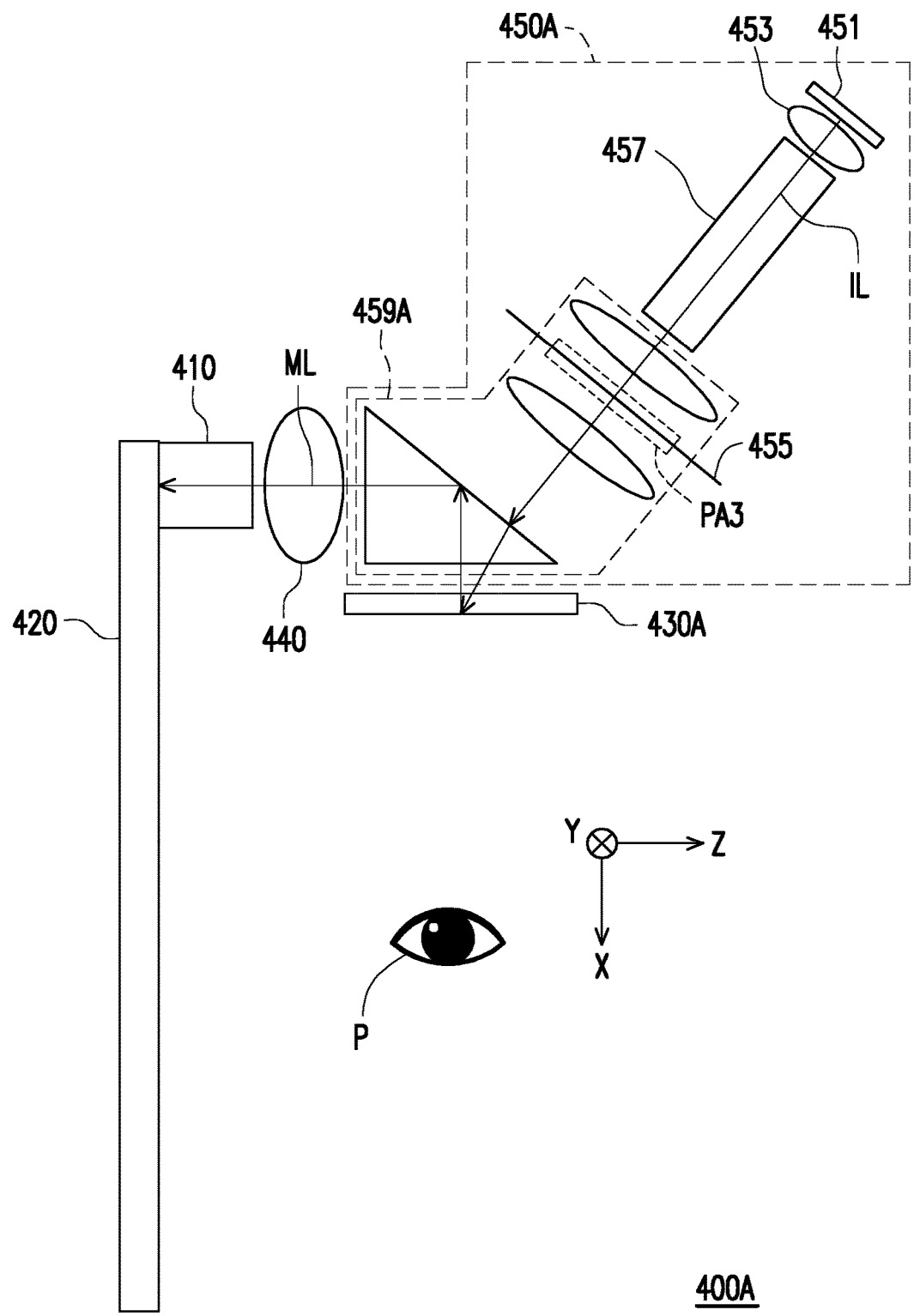
FIG. 19 is a schematic diagram of a HMD device according to an embodiment of the invention.

FIG. 19 is a schematic diagram of a HMD device according to an embodiment of the invention. Referring to FIG. 15 and FIG. 19, the HMD device 400A of the embodiment is similar to the HMD device 300A of FIG. 15, and a main difference there between is that a configuration position of an aperture stop 455 is different and a light uniforming element 457 is a light integration rod.

To be specific, in the embodiment, a prism module 459A includes a prism and two lenses, where the aperture stop 455 is disposed between the two lenses, and the light uniforming element 457 is, for example, a light integration rod. In the embodiment, the illumination beam IL coming from an illumination light source 451 is converged to the third stop PA3 in the illumination system 450A. The third stop PA3 is located at the aperture stop 455. In the embodiment, the aperture stop 455 may have a driving element. The driving element is used for controlling an aperture size of the aperture stop 455, so as to control a size of the third stop PA3, and control a magnitude of the cone angle of the illumination beam IL incident to the display device 430A. Therefore, after the second F value of the lens module 440 is determined, a magnitude of the first F value of the illumination system 450A may be controlled through the aperture stop 455, such that the HMD device 400A may be complied with the condition that the first F value is greater than or equal to the second F value.

Figure 20:
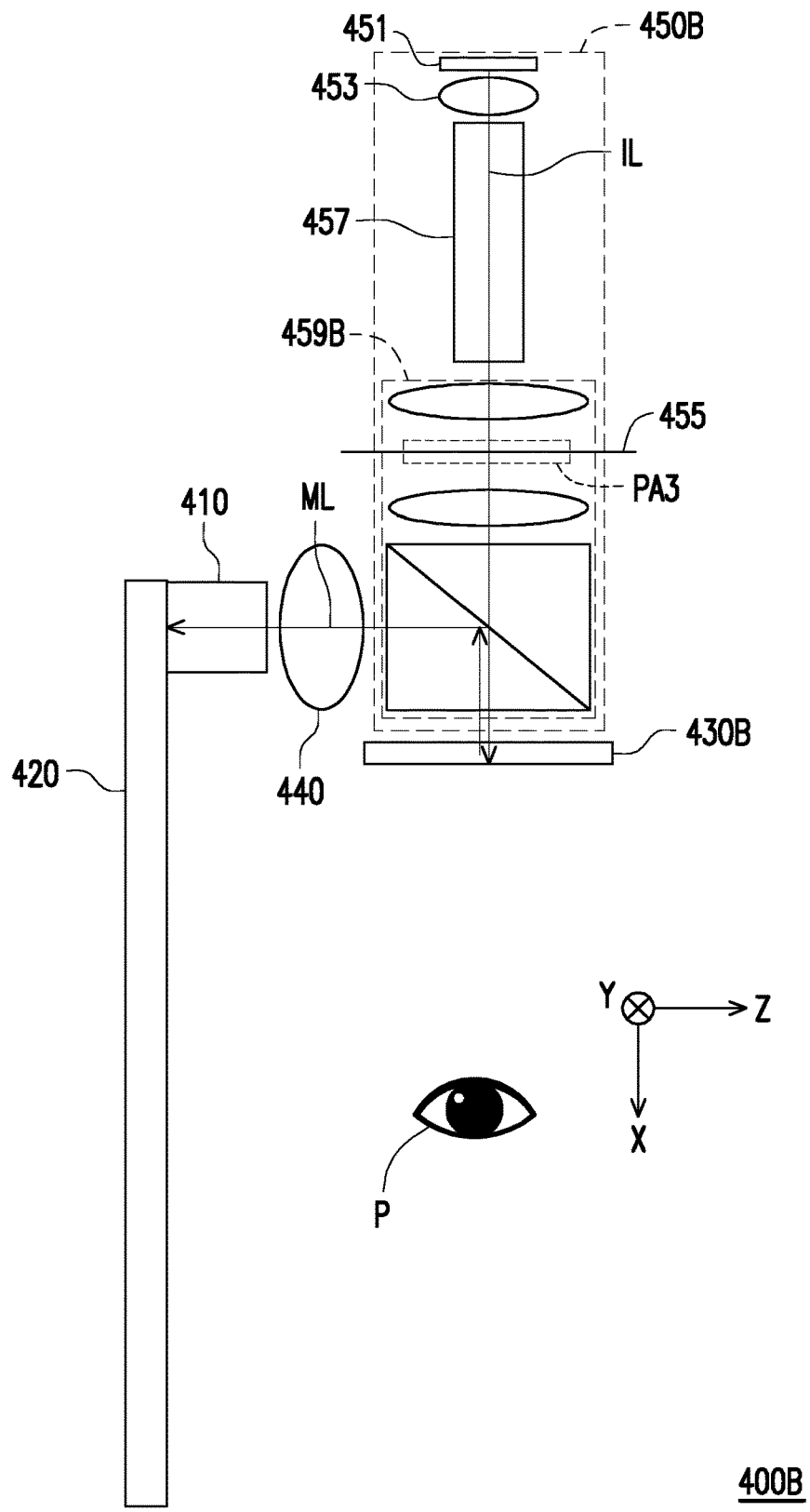
FIG. 20 is a schematic diagram of a HMD device according to an embodiment of the invention.

FIG. 20 is a schematic diagram of a HMD device according to an embodiment of the invention. Referring to FIG. 16 and FIG. 20, the HMD device 400B of the embodiment is similar to the HMD device 300B of FIG. 16, and a main difference there between is that a configuration position of the aperture stop 455 is different and the light uniforming element 457 is a light integration rod.

To be specific, in the embodiment, a prism module 459B includes two prisms and two lenses, where the aperture stop 455 is disposed between the two lenses of the prism module 459B, and the light uniforming element 457 is, for example, a light integration rod. In the embodiment, the illumination beam IL coming from the illumination light source 451 is converged to the third stop PA3 in the illumination system 450A. The third stop PA3 is located at the aperture stop 455. In the embodiment, the aperture stop 455 may have a driving element. The driving element is used for controlling an aperture size of the aperture stop 455, so as to control a size of the third stop PA3, and control a magnitude of the cone angle of the illumination beam IL incident to the display device 430A. Therefore, after the second F value of the lens module 440 is determined, a magnitude of the first F value of the illumination system 450A may be controlled through the aperture stop 455, such that the HMD device 400A may be complied with the condition that the first F value is greater than or equal to the second F value.

Figure 21:
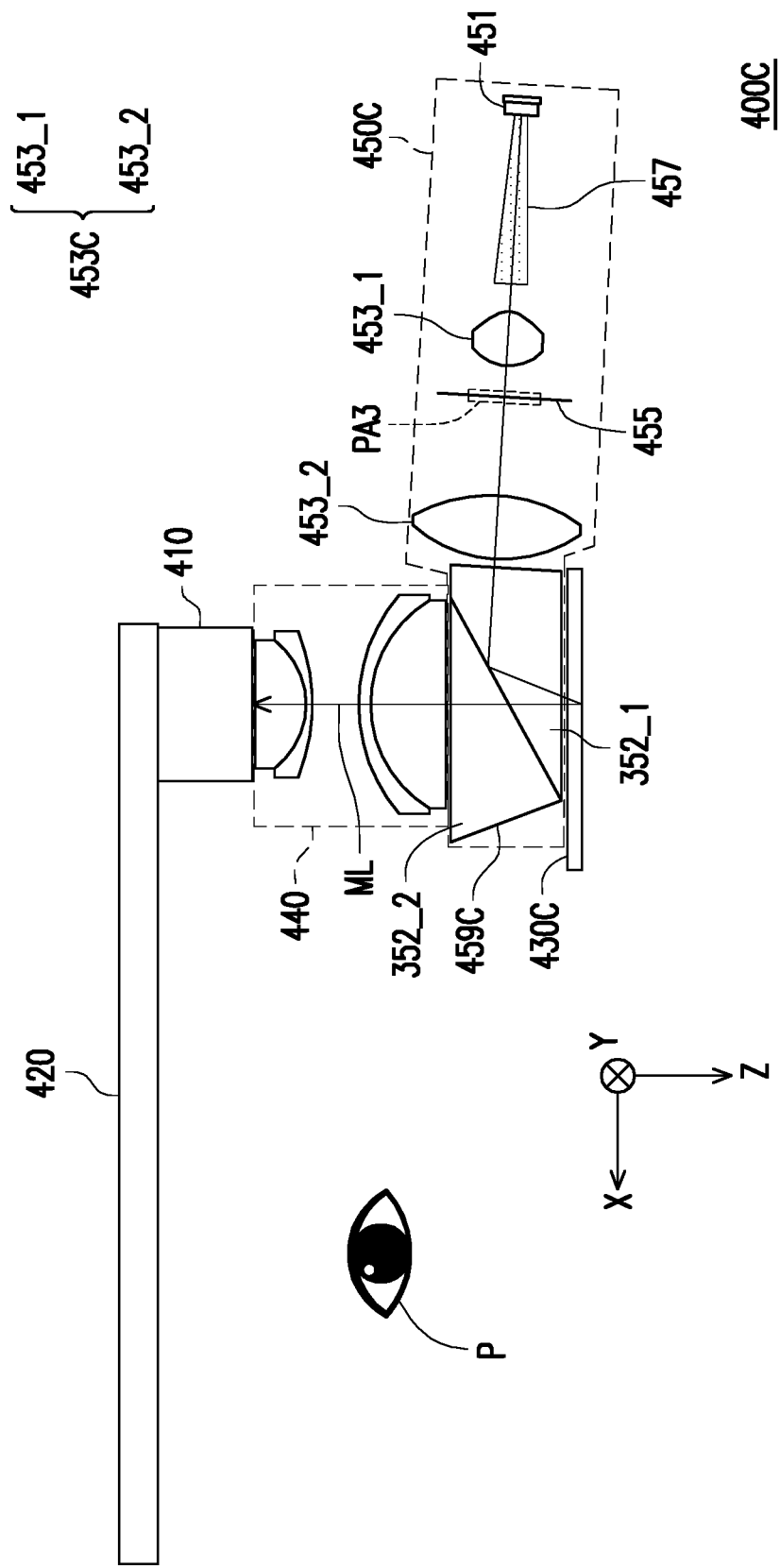
FIG. 21 is a schematic diagram of a HMD device according to an embodiment of the invention.

FIG. 21 is a schematic diagram of a HMD device according to an embodiment of the invention. Referring to FIG. 21, the HMD device 400C of the embodiment includes an illumination system 450C, a display device 430C, a lens module 440 and a waveguide system. The waveguide system includes a first waveguide element 410 and a second waveguide element 420. In the embodiment, the display device 430C, for example, includes a digital light Processing™ (DLP™) projection system or a LCoS projection system, which is used for converting an illumination beam IL coming from the illumination system 450C into the image beam ML. The image beam ML is transmitted to the projection target P through the waveguide system. In the embodiment, enough instructions and recommendations for the operation method of the waveguide system may be learned from the descriptions of the embodiments of FIG. 1 to FIG. 14B.

In the embodiment, the illumination system 450C is used for providing the illumination beam IL to the display device 430C. The illumination system 450C includes the illumination light source 451, the light uniforming element 457, a collimation lens set 453C, the aperture stop 455, and a prism module 459C. The illumination light source 451 provides the illumination beam IL. The illumination beam IL is transmitted to the display device 430C through the light uniforming element 457, the aperture stop 455, the collimation lens set 453C and the prism module 459C. In the embodiment, the collimation lens set 453C includes lenses 453_1 and 453_2. The aperture stop 455 is disposed between the lenses 453_1 and 453_2 of the collimation lens set 453C. The light uniforming element 457 is, for example, a light integration rod. In the embodiment, the illumination beam IL coming from the illumination light source 451 is converged to the third stop PA3 in the illumination system 450C. The third stop PA3 is located at the aperture stop 455. In the embodiment, the aperture stop 455 may have a driving element, and the driving element is used for controlling an aperture size of the aperture stop 455, so as to control a size of the third stop PA3. Therefore, the aperture stop 455 may adjust a light flux of the illumination beam IL passing there through. In the embodiment, the prism module 459C includes a first prism 352_1 and a second prism 352_2. The illumination beam IL coming from the collimation lens set 453C is transmitted to the display device 430C through the reflection of the first prism 352_1, and the illumination beam IL is converted into the image beam ML and transmitted to the lens module 440 through the second lens 352_2.

In the embodiment, the aperture size of the aperture stop 455 may be adjusted to control a size of the third stop PA3, and the size of the third stop PA3 may influence a magnitude of the cone angle θ1 of the illumination beam IL incident to the display device 430C. Therefore, after the second F value of the lens module 440 is determined, a magnitude of the first F value of the illumination system 450C may be controlled through the aperture stop 455, such that the HMD device 400C may be complied with the condition that the first F value is greater than or equal to the second F value.

In summary, in the exemplary embodiments of the invention, the first stop is located within the first waveguide element, the second stop is located at the projection target, such that the HMD device may provide a large FOV, and a volume of the waveguide system is decreased. In the exemplary embodiments of the invention, the diffusion coating film of each of the light splitting elements may be determined according to different reflectivity requirements or product designs, so that the image frame at the projection target is maintained uniform and has good image quality. In the exemplary embodiments of the invention, the third stop is located in the illumination system, and the aperture stop is disposed at the third stop. The HMD device may the third stop and a magnitude of the first F value of the control system by adjusting the aperture stop, such that the HMD device is complied with the condition that the first F value is greater than or equal to the second F value, so as to mitigate the ghost phenomenon of the image frame to provide good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A head-mounted display device, comprising:
   an illumination system, configured to provide an illumination beam, and comprising an aperture stop;
   a display device, configured to convert the illumination beam into an image beam, wherein the image beam is transmitted and projected to a projection target;
   a lens module, configured to receive and project the image beam; and
   a waveguide system, configured to guide the image beam, and projecting the image beam to the projection target, wherein the waveguide system comprises a first waveguide element and a second waveguide element, the image beam is projected to the projection target through the lens module, the first waveguide element and the second waveguide element, the image beam is converged to a first stop within the first waveguide element, the first stop is located in the first waveguide element, the image beam leaves the second waveguide element, and is projected to a second stop outside the second waveguide element, the second stop is located at the projection target, wherein the illumination beam is converged to a third stop within the illumination system, and the aperture stop is located at the third stop, wherein the illumination beam has a first F value, the lens module has a second F value, the first F value is determined according to an area of the third stop, and the first F value is greater than or equal to the second F value.

2. The head-mounted display device as claimed in claim 1, wherein the first waveguide element comprises a first light incident surface, a first light emerging surface and a plurality of first light splitting elements, wherein the image beam coming from the display device is incident to the first waveguide element through the first light incident surface, and the image beam leaves the first waveguide element through the first light emerging surface, and the second waveguide element is connected to the first waveguide element and comprises a second light incident surface, a second light emerging surface and a plurality of second light splitting elements, wherein the image beam coming from the first waveguide element is incident to the second waveguide element through the second light incident surface.

3. The head-mounted display device as claimed in claim 1, wherein the first waveguide element and the second waveguide element have a gap there between.

4. A head-mounted display device, comprising:
   an illumination system, configured to provide an illumination beam, and comprising an aperture stop;
   a display device, configured to convert the illumination beam into an image beam, wherein the image beam is transmitted and projected to a projection target;
   a lens module, configured to receive and project the image beam; and
   a waveguide system, configured to guide the image beam, and projecting the image beam to the projection target, wherein the waveguide system comprises a first waveguide element and a second waveguide element, the image beam is projected to the projection target through the lens module, the first waveguide element and the second waveguide element, the image beam is converged to a first stop within the first waveguide element, the first stop is located in the first waveguide element, the image beam leaves the second waveguide element, and is projected to a second stop outside the second waveguide element, the second stop is located at the projection target, wherein the illumination beam is converged to a third stop within the illumination system, and the aperture stop is located at the third stop, wherein the illumination system further comprises an illumination light source, a collimation lens set, a light uniforming element and a prism module, the illumination light source provides the illumination beam, and the illumination beam is transmitted to the display device through the collimation lens set, the aperture stop, the light uniforming element and the prism module.

5. The head-mounted display device as claimed in claim 4, wherein the light uniforming element is a fly-eye lens array, and the aperture stop is disposed between the collimation lens set and the light uniforming element.

6. The head-mounted display device as claimed in claim 5, wherein the prism module is a polarizing beam splitter, and the illumination beam provided by the illumination light source has a polarity.

7. The head-mounted display device as claimed in claim 4, wherein the light uniforming element is a light integration rod, and the aperture stop is disposed in the prism module.

8. The head-mounted display device as claimed in claim 4, wherein the prism module comprises a first prism, and the illumination beam coming from the light uniforming element is transmitted to the display device through the first prism.

9. The head-mounted display device as claimed in claim 4, wherein the prism module comprises a first prism, a second prism and a third prism, and the illumination beam coming from the light uniforming element is transmitted to the display device through the first prism, the second prism and the third prism.

10. The head-mounted display device as claimed in claim 9, wherein a first gap is located between the first prism and the second prism, a second gap is located between the second prism and the third prism, and the illumination beam coming from the light uniforming element is transmitted to the display device through the first gap and the second gap.

11. The head-mounted display device as claimed in claim 9, wherein the first prism has a curved surface configured to reflect the illumination beam coming from the light uniforming element, wherein the curved surface has a reflecting layer.

12. A head-mounted display device, comprising:
an illumination system, configured to provide an illumination beam, and comprising an aperture stop;
a display device, configured to convert the illumination beam into an image beam, wherein the image beam is transmitted and projected to a projection target;
a lens module, configured to receive and project the image beam; and
a waveguide system, configured to guide the image beam, and projecting the image beam to the projection target, wherein the waveguide system comprises a first waveguide element and a second waveguide element, the image beam is projected to the projection target through the lens module, the first waveguide element and the second waveguide element, the image beam is converged to a first stop within the first waveguide element, the first stop is located in the first waveguide element, the image beam leaves the second waveguide element, and is projected to a second stop outside the second waveguide element, the second stop is located at the projection target, wherein the illumination beam is converged to a third stop within the illumination system, and the aperture stop is located at the third stop, wherein the illumination system further comprises an illumination light source, a light uniforming element, a collimation lens set and a prism module, the illumination light source provides the illumination beam, and the illumination beam is transmitted to the display device through the light uniforming element, the collimation lens set and the prism module.

13. The head-mounted display device as claimed in claim 12, wherein the light uniforming element is a light integration rod, and the aperture stop is disposed in the collimation lens set.

14. The head-mounted display device as claimed in claim 12, wherein the prism module comprises a first prism and a second prism, and the illumination beam coming from the collimation lens set is transmitted to the display device through the first prism and the second prism.

15. The head-mounted display device as claimed in claim 12, wherein a gap is located between the first prism and the second prism, and the illumination beam coming from the light uniforming element is transmitted to the display device through the gap.

16. A head-mounted display device, comprising:
an illumination system, configured to provide an illumination beam, and comprising an aperture stop;
a display device, configured to convert the illumination beam into an image beam, wherein the image beam is transmitted and projected to a projection target;
a lens module, configured to receive and project the image beam; and
a waveguide system, configured to guide the image beam, and projecting the image beam to the projection target, wherein the waveguide system comprises a first waveguide element and a second waveguide element, the image beam is projected to the projection target through the lens module, the first waveguide element and the second waveguide element, the image beam is converged to a first stop within the first waveguide element, the first stop is located in the first waveguide element, the image beam leaves the second waveguide element, and is projected to a second stop outside the second waveguide element, the second stop is located at the projection target, wherein the illumination beam is converged to a third stop within the illumination system, and the aperture stop is located at the third stop, wherein the aperture stop has a driving element, the driving element is configured to control an aperture size of the aperture stop, so as to control an area of the third stop.

* * * * *